(12) United States Patent
Izadi et al.

(10) Patent No.: US 8,570,320 B2
(45) Date of Patent: Oct. 29, 2013

(54) USING A THREE-DIMENSIONAL ENVIRONMENT MODEL IN GAMEPLAY

(75) Inventors: Shahram Izadi, Cambridge (GB); David Molyneaux, Oldham (GB); Otmar Hilliges, Cambridge (GB); David Kim, Cambridge (GB); Jamie Daniel Joseph Shotton, Cambridge (GB); Pushmeet Kohli, Cambridge (GB); Andrew Fitzgibbon, Cambridge (GB); Stephen Edward Hodges, Cambridge (GB); David Alexander Butler, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 261 days.

(21) Appl. No.: 13/017,729

(22) Filed: Jan. 31, 2011

(65) Prior Publication Data

US 2012/0194517 A1    Aug. 2, 2012

(51) Int. Cl.
*G06T 17/00* (2006.01)
*G09G 5/00* (2006.01)

(52) U.S. Cl.
USPC .......................................... 345/420; 345/156

(58) Field of Classification Search
None
See application file for complete search history.

(56) References Cited

U.S. PATENT DOCUMENTS

| | | | |
|---|---|---|---|
| 5,696,591 A | 12/1997 | Bilhorn et al. | |
| 5,699,444 A * | 12/1997 | Palm | 382/106 |
| 5,745,126 A * | 4/1998 | Jain et al. | 382/154 |
| 6,009,359 A | 12/1999 | El-Hakim et al. | |
| 6,084,979 A * | 7/2000 | Kanade et al. | 382/154 |
| 6,130,677 A * | 10/2000 | Kunz | 345/630 |
| 6,405,151 B1 * | 6/2002 | Fujii et al. | 702/155 |
| 6,504,569 B1 | 1/2003 | Jasinschi et al. | |
| 6,781,618 B2 | 8/2004 | Beardsley | |
| 6,940,538 B2 | 9/2005 | Rafey et al. | |
| 7,098,435 B2 * | 8/2006 | Mueller et al. | 250/208.1 |
| 7,135,992 B2 | 11/2006 | Karlsson et al. | |
| 7,257,237 B1 * | 8/2007 | Luck et al. | 382/103 |
| 7,366,325 B2 | 4/2008 | Fujimura et al. | |
| 7,684,592 B2 | 3/2010 | Paul et al. | |
| 7,697,748 B2 | 4/2010 | Dimsdale et al. | |

(Continued)

OTHER PUBLICATIONS

"International Search Report", Mailed Date: Aug. 30, 2012, Application No. PCT/US2012/020687, Filed Date: Jan. 9, 2012, pp. 8.

(Continued)

*Primary Examiner* — Daniel Hajnik
*Assistant Examiner* — Jason Pringle-Parker
(74) *Attorney, Agent, or Firm* — Zete Law, P.L.L.C.; MacLane C. Key

(57) ABSTRACT

Use of a 3D environment model in gameplay is described. In an embodiment, a mobile depth camera is used to capture a series of depth images as it is moved around and a dense 3D model of the environment is generated from this series of depth images. This dense 3D model is incorporated within an interactive application, such as a game. The mobile depth camera is then placed in a static position for an interactive phase, which in some examples is gameplay, and the system detects motion of a user within a part of the environment from a second series of depth images captured by the camera. This motion provides a user input to the interactive application, such as a game. In further embodiments, automatic recognition and identification of objects within the 3D model may be performed and these identified objects then change the way that the interactive application operates.

20 Claims, 14 Drawing Sheets

(56) References Cited

U.S. PATENT DOCUMENTS

| | | | |
|---|---|---|---|
| 7,860,301 | B2 | 12/2010 | Se et al. |
| 8,023,726 | B2* | 9/2011 | Sundaresan et al. ........... 382/154 |
| 2002/0024517 | A1* | 2/2002 | Yamaguchi et al. ........... 345/424 |
| 2002/0186216 | A1* | 12/2002 | Baumberg et al. ............. 345/422 |
| 2003/0067461 | A1 | 4/2003 | Fletcher et al. |
| 2004/0023612 | A1* | 2/2004 | Kriesel ............................ 452/157 |
| 2004/0075738 | A1 | 4/2004 | Burke et al. |
| 2004/0104935 | A1* | 6/2004 | Williamson et al. ........... 345/757 |
| 2004/0167667 | A1 | 8/2004 | Goncalves et al. |
| 2004/0233287 | A1 | 11/2004 | Schnell |
| 2004/0239670 | A1* | 12/2004 | Marks ............................. 345/419 |
| 2005/0238200 | A1 | 10/2005 | Gupta et al. |
| 2006/0006309 | A1* | 1/2006 | Dimsdale et al. ........... 250/206.1 |
| 2006/0221250 | A1 | 10/2006 | Rossbach et al. |
| 2006/0252474 | A1* | 11/2006 | Zalewski et al. .................. 463/1 |
| 2006/0252475 | A1* | 11/2006 | Zalewski et al. .................. 463/1 |
| 2006/0252477 | A1* | 11/2006 | Zalewski et al. .................. 463/7 |
| 2006/0252541 | A1* | 11/2006 | Zalewski et al. ................ 463/36 |
| 2006/0262188 | A1* | 11/2006 | Elyada et al. ................... 348/143 |
| 2007/0052807 | A1 | 3/2007 | Zhou et al. |
| 2007/0060336 | A1* | 3/2007 | Marks et al. ...................... 463/30 |
| 2007/0116356 | A1 | 5/2007 | Gong et al. |
| 2007/0156286 | A1 | 7/2007 | Yamauchi |
| 2007/0298882 | A1* | 12/2007 | Marks et al. ..................... 463/36 |
| 2008/0009348 | A1* | 1/2008 | Zalewski et al. ................ 463/40 |
| 2008/0055308 | A1* | 3/2008 | Dekel et al. .................... 345/421 |
| 2008/0060854 | A1 | 3/2008 | Perlin |
| 2008/0152191 | A1 | 6/2008 | Fujimura et al. |
| 2008/0304707 | A1 | 12/2008 | Oi et al. |
| 2009/0027337 | A1* | 1/2009 | Hildreth ......................... 345/158 |
| 2009/0066690 | A1* | 3/2009 | Harrison ........................ 345/419 |
| 2009/0066784 | A1* | 3/2009 | Stone et al. ....................... 348/47 |
| 2009/0158220 | A1* | 6/2009 | Zalewski et al. .............. 715/863 |
| 2009/0231425 | A1 | 9/2009 | Zalewski |
| 2009/0244097 | A1* | 10/2009 | Estevez .......................... 345/633 |
| 2009/0315978 | A1* | 12/2009 | Wurmlin et al. ................. 348/43 |
| 2010/0060632 | A1* | 3/2010 | Lefevre et al. ................. 345/419 |
| 2010/0085352 | A1 | 4/2010 | Zhou et al. |
| 2010/0085353 | A1 | 4/2010 | Zhou et al. |
| 2010/0094460 | A1 | 4/2010 | Choi et al. |
| 2010/0103196 | A1 | 4/2010 | Kumar et al. |
| 2010/0111370 | A1 | 5/2010 | Black et al. |
| 2010/0128112 | A1* | 5/2010 | Marti et al. ....................... 348/51 |
| 2010/0208035 | A1* | 8/2010 | Pinault et al. .................... 348/46 |
| 2010/0278384 | A1 | 11/2010 | Shotton et al. |
| 2010/0281432 | A1 | 11/2010 | Geisner et al. |
| 2010/0289817 | A1* | 11/2010 | Meier et al. .................... 345/619 |
| 2010/0302247 | A1* | 12/2010 | Perez et al. ..................... 345/440 |
| 2010/0302395 | A1 | 12/2010 | Mathe et al. |
| 2011/0254860 | A1* | 10/2011 | Zontrop et al. ................. 345/633 |

OTHER PUBLICATIONS

U.S. Appl. No. 12/367,665, filed Feb. 9, 2009, "Camera Based Motion Sensing System".

U.S. Appl. No. 12/790,026, filed May 28, 2010, "Foreground and Background Image Segmentation".

U.S. Appl. No. 12/877,595, filed Sep. 8, 2010, "Depth Camera Based on Structured Light and Stereo Vision".

Baltzakis, et al., "Tracking of human hands and faces through probabilistic fusion of multiple visual cues", retrieved on Nov. 28, 2010 at <<http://citeseerx.ist.psu.edu/viewdoc/download?doi=10.1.1.158.8443&rep=rep1&type=pdf>>, IEEE, Intl Conference on Computer Vision Systems (ICVS), Santorini, Greece, May 2008, pp. 1-10.

Benko, et al., "Depth Touch: Using Depth-Sensing Camera to Enable Freehand Interactions on and Above the Interactive Surface", retrieved on Nov. 29, 2010 at <<http://research.microsoft.com/en-us/um/people/benko/ publications/2008/DepthTouch_poster.pdf>>, IEEE Tabletops and Interactive Surfaces, Amsterdam, the Netherlands, Oct. 2008, pp. 1.

Besl, et al., "A Method for Registration of 3-D Shapes", IEEE Transactions on Pattern Analysis and Machine Intelligence, vol. 14, No. 2, Feb. 1992, pp. 239-256.

Blais, et al., "Registering Multiview Range Data to Create 3D Computer Objects", IEEE Transactions on Pattern Analysis and Machine Intelligence, vol. 17, No. 8, Aug. 1995, pp. 820-824.

Boehnke, "Fast Object Localization with Real Time 3D Laser Range Sensor Simulation", retrieved on Nov. 24, 2010 at <<http://www.wseas.us/e-library/transactions/electronics/2008/Paper%204%20BOEHNKE.pdf>>, WSEAS Transactions on Electronics, vol. 5, No. 3, Mar. 2008, pp. 83-92.

Bolitho, et al., "Parallel Poisson Surface Reconstruction", retrieved on Nov. 29, 2010 at <<http://www.cs.jhu.edu/~misha/MyPapers/ISVC09.pdf>>, Springer-Verlag Berlin, Proceedings of Intl Symposium on Advances in Visual Computing: Part I (ISVC), Nov. 2010, pp. 678-689.

Bolitho, "The Reconstruction of Large Three-dimensional Meshes", retrieved on Nov. 29, 2010 at <<http://www.cs.jhu.edu/~misha/Bolitho/Thesis.pdf>>, Johns Hopkins University, PhD Dissertation, Mar. 2010, pp. 1-171.

Botterill, et al., "Bag-of-Words-driven Single Camera SLAM", retrieved on Nov. 26, 2010 at <<http://www.hilandtom.com/tombotterill/Botterill-Mills-Green-2010-BoWSLAM.pdf>>, Journal on Image and Video Processing, Aug. 2010, pp. 1-18.

Broll, et al., "Toward Next-Gen Mobile AR Games", retrieved on Nov. 24, 2010 at <<http://ieeexplore.ieee.org/stamp/stamp.jsp?tp=&arnumber=4557954>>, IEEE Computer Society, IEEE Computer Graphics and Applications, vol. 28, No. 4, 2008, pp. 40-48.

Campbell, et al., "Automatic 3D Object Segmentation in Multiple Views using Volumetric Graph-Cuts", Butterworth-Heinemann, Newton, MA, Image and Vision Computing, vol. 28, No. 1, Jan. 2010, pp. 14-25.

Carmody, "How Motion Detection Works in Xbox Kinect", retrieved on Nov. 29, 2010 at <<http://gizmodo.com/5681078/how-motion-detection-works-in-xbox-kinect>>, Gizmo.com. Nov. 3, 2010, pp. 1-4.

Chen, et al., "Object Modeling by Registration of Multiple Range Images", IEEE Proceedings of Intl Conference on Robotics and Automation, Sacramento, California , Apr. 1991, pp. 2724-2729.

Cheung, et al., "Robust Background Subtraction with Foreground Validation for Urban Traffic Video", retrieved on Nov. 28, 2010 at <<http://downloads.hindawi.com/journals/asp/2005/726261.pdf>>, Hindawi Publishing, EURASIP Journal on Applied Signal Processing, vol. 14, 2005, pp. 2330-2340.

Cohen, et al., "Interactive Fluid-Particle Simulation using Translating Eulerian Grids", ACM SIGGRAPH, Proceedings of Symposium on Interactive 3D Graphics and Games (I3D), 2010, pp. 15-22.

Curless, et al., "A Volumetric Method for Building Complex Models from Range Images", ACM SIGGRAPH, Proceedings of Conference on Computer Graphics and Interactive Techniques, New Orleans, LA, Aug. 1996, pp. 303-312.

Cutts, "Matt Cutts: Gadgets, Google, and SEO", retrieved on Nov. 30, 2010 at <<http://www.mattcutts.com/blog/>> Google/SEO, Nov. 2010, 10 pages.

Davison, et al., "Mobile Robot Localisation using Active Vision", Springer, LNCS vol. 1407, No. II, Proceedings of European Conference on Computer Vision, Freiburg, Germany, 1998, pp. 809-825.

de la Escalera, et al., "Automatic Chessboard Detection for Intrinsic and Extrinsic Camera Parameter Calibration", retrieved on Nov. 29, 2010 at <<http://www.mdpi.com/1424-8220/10/3/2027/pdf>>, Sensors, vol. 10, No. 3, 2010, pp. 2027-2044.

Elfes, et al., "Sensor Integration for Robot Navigation: Combining Sonar and Stereo Range Data in a Grid-Based Representation", IEEE, Proceedings of Conference on Decision and Control, Los Angeles, California, Dec. 1987, pp. 1802-1807.

Frahm, et al., "Building Rome on a Cloudless Day", Springer-Verlag Berlin, Proceedings of European Conference on Computer Vision: Part IV (ECCV), 2010, pp. 368-381.

Fujii, et al., "Three-dimensional finger tracking using direct and reflected infrared images", retrieved on Nov. 29, 2010 at <<http://www.acm.org/uist/archive/adjunct/2002/pdf/posters/p27-fujii.pdf>>, ACM, Symposium on User Interface Software and Technology (UIST), Paris, France, Oct. 2002, pp. 27-28.

(56) References Cited

OTHER PUBLICATIONS

Furukawa, et al., "Towards Internet-scale Multi-view Stereo", IEEE Computer Society, Proceedings of Conference on Computer Vision and Pattern Recognition (CVPR), San Francisco, California, Jun. 2010, pp. 1434-1441.
Goesele, et al., "Multi-View Stereo Revisited", IEEE Computer Society, Proceedings of Conference on Computer Vision and Pattern Recognition (CVPR), New York, NY, vol. 2, 2006, pp. 2402-2409.
Hadwiger, et al., "Advanced Illumination Techniques for GPU-Based Volume Raycasting", ACM SIGGRAPH, Intl Conference on Computer Graphics and Interactive Techniques, 2009, pp. 1-56.
Harada, "Real-Time Rigid Body Simulation on GPUs", retrieved on Apr. 18, 2011 at <<http.developer.nvidia.com/GPUGems3/gpugems3_ch29.html>>, Nvidia, GPU Gems 3, Chapter 29, 2008, pp. 1-21.
Henry, et al., "RGB-D Mapping: Using Depth Cameras for Dense 3D Modeling of Indoor Environments", ISER, 2010, pp. 1-2.
Herath, et al., "Simultaneous Localisation and Mapping: A Stereo Vision Based Approach", retrieved on Nov. 26, 2010 at <<http://ieeexplore.ieee.org/stamp/stamp.jsp?tp=&arnumber=4058480>>, IEEE, Intl Conference on Intelligent Robots and Systems, Beijing, China, Oct. 2006, pp. 922-927.
Hirsch, et al., "BiDi Screen: A Thin, Depth-Sensing LCD for 3D Interaction using Light Fields", retrieved on Nov. 29, 2010 at <<http://src.acm.org/2010/MatthewHirsch/BiDiScreen/BiDi%20Screen.htm>>, ACM SIGGRAPH Asia, Transactions on Graphics (TOG), vol. 28, No. 5, Dec. 2009, pp. 1-7.
Hogue, et al., "Underwater environment reconstruction using stereo and inertial data", retrieved on Nov. 29, 2010 at <<http://ieeexplore.ieee.org/stamp/stamp.jsp?arnumber=04413666>>, IEEE Intl Conference on Systems, Man and Cybernetics, Montreal, Canada, Jan. 2008, pp. 2372-2377.
Jivet, et al., "Real Time Representation of 3D Sensor Depth Images", retrieved on Nov. 29, 2010 at <<http://www.wseas.us/e-library/transactions/electronics/2008/Paper%202%20JIVET.pdf>>, WSEAS Transactions on Electronics, vol. 5, No. 3, Mar. 2008, pp. 65-71.
Kazhdan, et al., "Poisson Surface Reconstruction", Eurographics Symposium on Geometry Processing, 2006, pp. 61-70.
Kil, et al., "GPU-assisted Surface Reconstruction on Locally-Uniform Samples", retrieved on Nov. 29, 2010 at <<http://graphics.cs.ucdavis.edu/~yjkil/pub/psurface/Kil.PS.IMR08.pdf>>, Proceedings of Intl Meshing Roundtable, 2008, pp. 369-385.
Kim, et al., "Relocalization Using Virtual, Keyframes for Online Environment Map Construction", retrieved on Nov. 26, 2010 at <<http://www.cs.ucsb.edu/~holl/pubs/Kim-2009-VRST.pdf>>, ACM, Proceedings of Symposium on Virtual Reality Software and Technology (VRST), Kyoto, Japan, Nov. 2009, pp. 127-134.
Klein, et al., "Parallel Tracking and Mapping for Small AR Workspaces", IEEE, Intl Symposium on Mixed and Augmented Reality, Nov. 2007, ISMAR, Nara, Japan, pp. 225-234.
Le Grand, "Broad-Phase Collision Detection with CUDA", retrieved on Apr. 2, 2011 at <<http.developer.nvidia.comlGPUGems3/gpugems3ch32.html>>, Nvidia, GPU Gems 3, Chapter 32, 2008, pp. 1-24.
Levoy, et al., "The Digital Michelangelo Project: 3D Scanning of Large Statues", ACM SIGGRAPH, New Orleans, LA, 2000, pp. 131-144.
Lorensen, et al., "Marching Cubes: A High Resolution 3D Surface Construction Algorithm", Computer Graphics, vol. 21, No. 4, Jul. 1987, pp. 163-169.
Michel, et al., "GPU-accelerated Real-Time 3D Tracking for Humanoid Locomotion and Stair Climbing", retrieved on Nov. 24, 2010 at <<http://ieeexplore.ieee.org/stamp/stamp.jsp?tp=&arnumber=4399104>>, IEEE, Proceedings of IEEE/RSJ Intl Conference on Intelligent Robots and Systems, San Diego, California, Nov. 2007, pp. 463-469.
Molchanov, et al., "Non-iterative Second-order Approximation of Signed Distance Functions for Any Isosurface Representation", retrieved on Nov. 29, 2010 at <<http://www.paul-rosenthal.de/wp-content/uploads/2010/06/molchanov_eurovis_2010.pdf>>, Blackwell Publishing, Eurographics/ IEEE-VGTC Symposium on Visualization, vol. 29, No. 3, 2010, pp. 1-10.
Newcombe, et al., "Live Dense Reconstruction with a Single Moving Camera", IEEE Computer Society, Proceedings of Conference on Computer Vision and Pattern Recognition (CVPR), 2010, pp. 1498-1505.
Osher, et al., "Level Set Methods and Dynamic Implicit Surfaces, Signed Distance Functions", Springer-Verlag New York, Applied Mathematical Sciences, Chapter 2, 2002, pp. 17-22.
Parker, et al., "Interactive Ray Tracing for Isosurface Rendering", IEEE Computer Society, Proceedings of Conference on on Visualization (VIS), 1998, pp. 233-238 and 538.
Pollefeys, et al., "Detailed Real-Time Urban 3D Reconstruction From Video", Kluwer Academic Publishers, International Journal of Computer Vision, vol. 78, No. 2-3, Jul. 2008, pp. 143-167.
Purcell, et al., "Ray Tracing on Programmable Graphics Hardware", ACM Transactions on Graphics, vol. 1, No. 3, Jul. 2002, pp. 268-277.
Rusinkiewicz, et al., "Real-Time 3D Model Acquisition", ACM SIGGRAPH, Proceedings of Conference on Computer Graphics and Interactive Techniques, 2002, pp. 438-446.
Seitz, et al., "A Comparison and Evaluation of Multi-View Stereo Reconstruction Algorithms", IEEE Computer Society, Proceedings of Conference on Computer Vision and Pattern Recognition (CVPR), vol. 1, 2006, pp. 519-528.
Stein, et al., "Structural Indexing: Efficient 3-D Object Recognition", IEEE Transactions on Pattern Analysis and Machine Intelligence, vol. 14, No. 2, Feb. 1992, pp. 125-145.
Stuhmer, et al., "Real-Time Dense Geometry from a Handheld Camera", Springer-Verlag Berlin, LNCS 6376, Conference on Pattern Recognition (DAGM), 2010, pp. 11-20.
Thrun, et al., "Probabilistic Robotics", The MIT Press, Chapter 9, Sep. 2005, pp. 281-335.
van Dam, et al., "Immersive VR for Scientific Visualization: A Progress Report", retrieved on Nov. 24, 2010 at <<http://ieeexplore.ieee.org/stamp/stamp.jsp?tp=&arnumber=888006>>, IEEE Computer Society, IEEE Computer Graphics and Applications, vol. 20, No. 6, Nov. 2000, pp. 26-52.
Vaughan-Nichols, "Game-Console Makers Battle over Motion-Sensitive Controllers", retrieved on Nov. 24, 2010 at <<http://ieeexplore.ieee.org/stamp/stamp.jsp?tp=&arnumber=5197417>>, IEEE Computer Society, Computer, Aug. 2009, pp. 13-15.
Vidal, et al., "Pursuit-Evasion Games with Unmanned Ground and Aerial Vehicles", retrieved on Nov. 24, 2010 at <<http://ieeexplore.ieee.org/stamp/stamp.jsp?tp=&arnumber=933069>>, IEEE, Proceedings of IEEE Intl Conference on Robotics and Automation, Seoul, Korea, May 2001, pp. 2948-2955.
Vogiatzis, et al., "Reconstructing relief surfaces", Elsevier Press, Image and Vision Computing, vol. 26, 2008, pp. 397-404.
Welch, et al., "Motion Tracking: No Silver Bullet, but a Respectable Arsenal", retrieved on Nov. 24, 2010 at <<http://ieeexplore.ieee.org/stamp/stamp.jsp?tp=&arnumber=1046626>>, IEEE Computer Society, IEEE Computer Graphics and Applications, vol. 22, No. 6, Nov. 2002, pp. 24-38.
Williams, et al., "Real-Time SLAM Relocalisation", retrieved on Nov. 26, 2010 at <<http://www.robots.ox.ac.uk:5000/~lav/Papers/williams_etal_iccv2007/williams_etal_iccv2007.pdf>>, IEEE, Proceedings of Intl Conference on Computer Vision (ICCV), Rio de Janeiro, Brazil, Oct. 2007, pp. 1-8.
Wilson, et al., "Combining Multiple Depth Cameras and Projectors for Interactions On, Above, and Between Surfaces", retrieved on Nov. 29, 2010 at <<http://research.microsoft.com/en-us/um/people/awilson/publications/wilsonuist2010/Wilson%20UIST%202010%20LightSpace.pdf>>, ACM, Proceedings of Symposium on User Interface Software and Technology (UIST), New York, NY, Oct. 2010, pp. 273-282.
Wurm, et al., "OctoMap: A Probabilistic, Flexible, and Compact 3D Map Representation for Robotic Systems", Proceedings of Workshop on Best Practice in 3D Perception and Modeling for Mobile Manipulation (ICRA), Anchorage, Alaska, May 2010, 8 pages.
Yu, et al., "Monocular Video Foreground/Background Segmentation by Tracking Spatial-Color Gaussian Mixture Models", retrieved on Nov. 28, 2010 at <<http://research.microsoft.com/en-us/um/people/

(56) References Cited

OTHER PUBLICATIONS cohen/segmentation.pdf>>, IEEE, Proceedings of Workshop on Motion and Video Computing (WMVC), Feb. 2007, pp. 1-8.

Zach, et al., "A Globally Optimal Algorithm for Robust TV-L1 Range Image Integration", IEEE Proceedings of Intl Conference on Computer Vision (ICCV), 2007, pp. 1-8.

Zhou, et al., "Data-Parallel Octrees for Surface Reconstruction", IEEE Transactions on Visualization and Computer Graphics, vol. 17, No. 5, May 2011, pp. 669-681.

Zhou, et al., "Highly Parallel Surface Reconstruction", retrieved on Nov. 29, 2010 at <<http://research.microsoft.com/pubs/70569/tr-2008-53.pdf>>, Microsoft Corporation, Microsoft Research, Technical Report MSR-TR-2008-53, Apr. 2008, pp. 1-10.

* cited by examiner

USING A THREE-DIMENSIONAL ENVIRONMENT MODEL IN GAMEPLAY

BACKGROUND

Gaming systems have been developed which use cameras, such as video or depth cameras, to detect the movement of a user or of a controller held by the user and so enable user interaction with a game. In order to detect the position/motion of a user, the images captured by the camera are segmented to select the foreground (the user) and to remove the background. A user can then interact with characters or objects in the game in an environment which is created within the game itself and which is totally separate from the actual environment of the user. The embodiments described below are not limited to implementations which solve any or all of the disadvantages of known gaming systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Use of a 3D environment model in gameplay is described. In an embodiment, a mobile depth camera is used to capture a series of depth images as it is moved around and a dense 3D model of the environment is generated from this series of depth images. This dense 3D model is incorporated within an interactive application, such as a game. The mobile depth camera is then placed in a static position for an interactive phase, which in some examples is gameplay, and the system detects motion of a user within a part of the environment from a second series of depth images captured by the camera. This motion provides a user input to the interactive application, such as a game. In further embodiments, automatic recognition and identification of objects within the 3D model may be performed and these identified objects then change the way that the interactive application operates.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
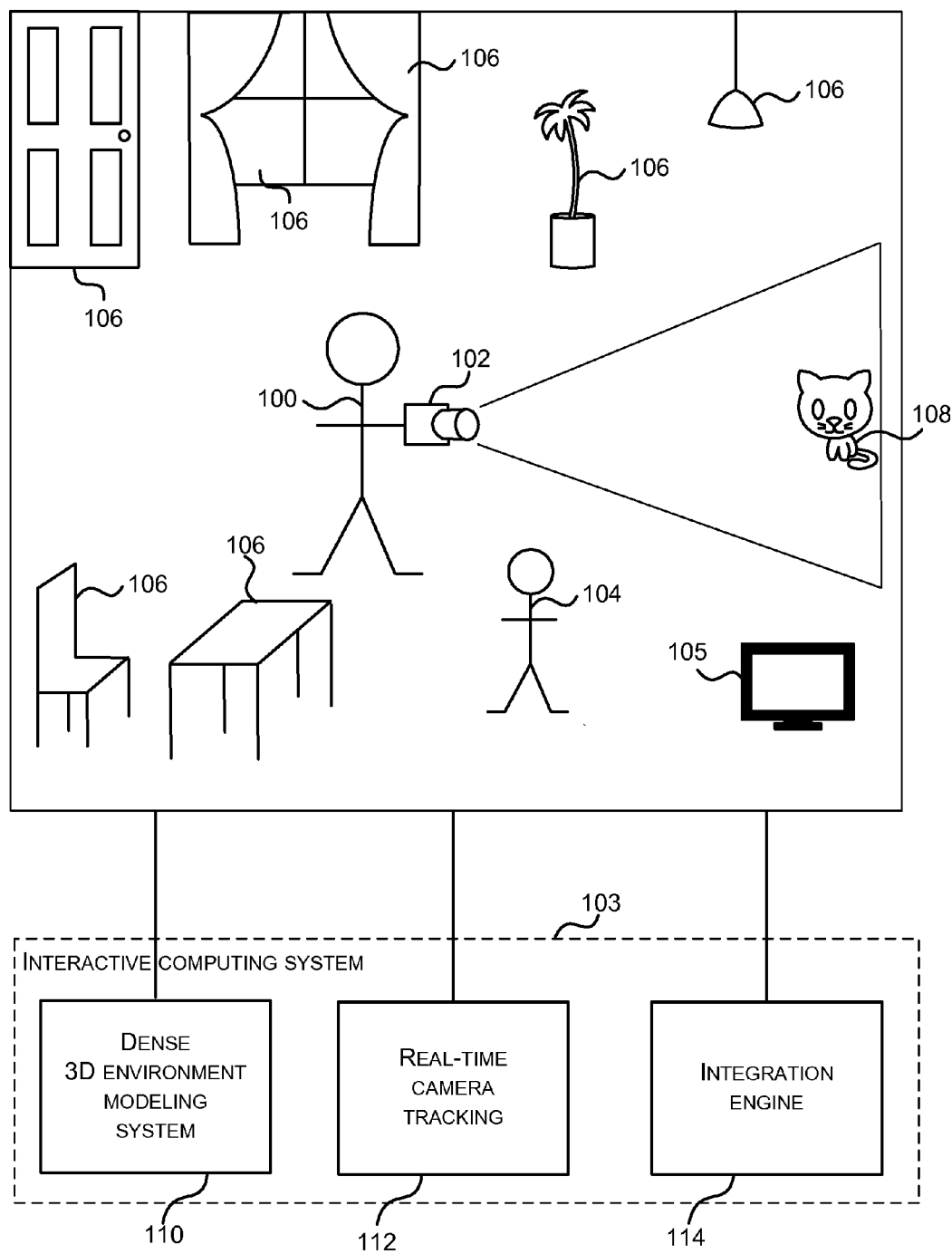
FIG. 1 is a schematic diagram of a person standing in a room and holding a mobile depth camera which may be used to generate a 3D model of the MOM.

FIG. 1 is a schematic diagram of a person 100 standing in a room and holding a mobile depth camera 102 which in communication with (and may be considered to form part of) an interactive computing system 103, such as a gaming system. The room contains various objects 106 (such as a chair, table, door, window, plant and light), another person 104, a display 105 and a cat 108. The display 105 may, for example, be a television or computer monitor or may alternatively be any other form of display capable of displaying a graphical user interface (GUI) of the interactive computing system 103, including eyewear which incorporates a display or a projected display. Many of the objects 106 are static although some of the objects such as the people 100, 104 and cat 108 may move. As the person 100 holding the mobile depth camera 102 moves around the room or moves the mobile depth camera 102 whilst standing still, the mobile depth camera captures depth images of the room and the objects.

The mobile depth camera 102 is in communication with a dense 3D environment modeling system 110 (the environment in this case is the room), which may be part of the interactive computing system 103. "Dense" in this example refers to a high degree of accuracy and resolution of the model resulting from the use of all or many of the points from the incoming depth maps to implicitly describe the surface. This can be contrasted with a "sparse" model that only takes a subset of the points to speed up calculations and reduce memory footprint. For example, images captured by the mobile depth camera 102 are used to form and build up a dense 3D model of the environment as the person moves about the room or moves the mobile depth camera 102 around.

A real-time camera tracking system 112 monitors the location and orientation of the camera 102 in the room. The real-time camera tracking system 112 may be integral with the mobile depth camera 102 or may be at another location, such as part of the interactive computing system 103. Irrespective of where the real-time camera tracking system 112 is located, it is able to receive communication from the mobile depth camera 102, either directly or indirectly. In an example, the real-time camera tracking system 112 may be provided at a computing device which is part of the interactive computing system 103 and may be in wireless communication with the mobile depth camera 102. In other examples the real-time camera tracking system 112 may be elsewhere in the building or at another remote location in communication with the mobile depth camera 102 using a communications network of any suitable type.

The real-time camera tracking system 112 provides input to the dense 3D modeling system, in order to allow individual depth images to be built up into an overall 3D model. The real-time camera tracking system 112 may also track the position of the camera in relation to the 3D model of the environment. The combination of camera tracking and 3D modeling is known as simultaneous localization and mapping (SLAM).

The outputs of the real-time camera tracking system 112 and dense 3D modeling system 110 may be used by an integration engine 114, which may comprise a gaming engine, augmented reality engine or any engine which enables integration of at least part of a dense 3D model of the environment into an application. For example, the integration engine may enable user interaction with an interactive application (which may be a game). For example, modeled real-world objects can be included in a gaming (or other interactive) environment and this is described in more detail below. In another example, a projector at the mobile depth camera 102 may be arranged to project images depending on the output of the real-time camera tracking system 112 and 3D modeling system 110.

Figure 2:
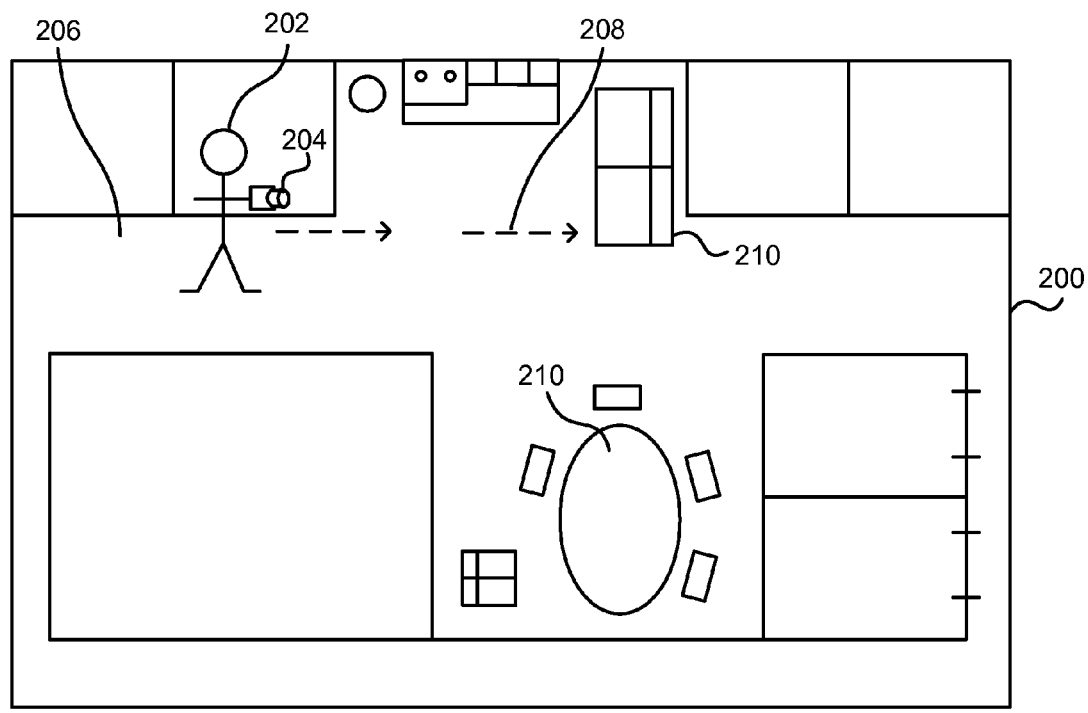
FIG. 2 illustrates a plan view of a floor of a building which is being explored by a person holding a mobile depth camera.

As a further example, FIG. 2 illustrates a plan view of a floor 200 of a building. A person 202 holding a mobile depth camera 204 is moving around the floor as indicated by dotted arrows 208. The person walks along a corridor 206 past rooms and furniture 210. The real-time camera tracking system 112 is able to track the position of the mobile depth camera 204 as it moves and the 3D modeling system generates a 3D model or map of the floor. It is not essential for a person 202 to carry the mobile depth camera 204. In other examples the mobile depth camera 204 is mounted on a robot or vehicle. This also applies to the example of FIG. 1.

Figure 3:
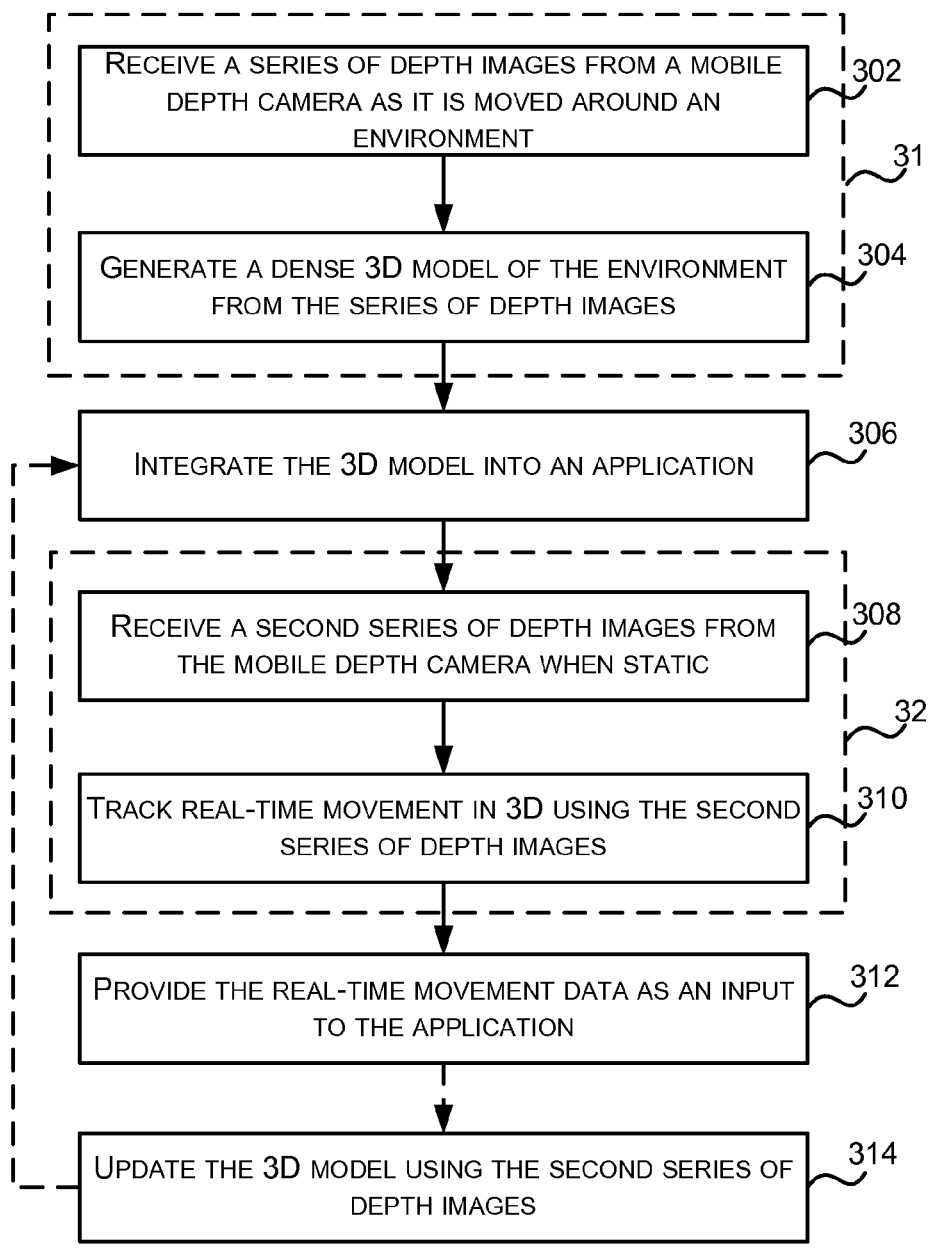
FIG. 3 is a flow diagram of an example of the operation of the interactive computing system shown in FIG. 1.

A flow diagram of an example of the operation of the interactive computing system 103 is shown in FIG. 3. A series of depth images are received from the mobile depth camera 102 as it is moved around an environment, such as the room shown in FIG. 1 (block 302). This series of depth images are then used to generate a dense 3D model of the environment (block 304) and this 3D model (or part of the model) is then integrated within an interactive application which runs on the interactive computing system and with which a user can interact (block 306). Where the interactive computing system 103 is a gaming system, the interactive application is a game and the 3D model (or a part of it) is integrated within the game. Once the 3D model has been integrated within the game, the model may be visible to the user or may be used within the game but not be visible to the user. The generation of the dense 3D model of the environment, which may also be referred to as a dense 3D background model, may be considered to be a first phase of operation of the interactive computing system (as indicated by dotted box 31) and may be performed offline or in real-time as part of the application (e.g. game) or as a separate activity (e.g. as a set-up phase for the game or for the gaming system).

A second series of depth images are subsequently received from the mobile depth camera 102 when the camera is static (block 308) and this second series of depth images are used to dynamically track real-time movement in 3D within the field of view (FOV) of the camera, which will represent only a region of the environment (e.g. only a part of the room) which was modeled in the first phase (block 310). This region of the environment may be referred to as the 'region of interest' and in some implementations there may be a defined fixed position for the mobile depth camera during this stage in the operation of the system (e.g. above or below the display 105 in FIG. 1). The real-time sensing in a part of the environment (blocks 308 and 310) may be considered to be a second phase of operation of the interactive computing system (as indicated by dotted box 32). The real-time movement data, which may comprise raw data or processed data, such as data on identified user gestures, is provided as an input to the interactive application (block 312). The second series of depth images may also (in real-time or subsequently) be used to update the 3D model which was generated previously (block 314) and the updated model (or aspects of the updated model) may then be fed back into the application (as indicated by the dotted arrow from block 314 to block 306).

The incorporation of the detailed model of the environment (which may be considered the background) into an interactive application, such as a game, improves the overall user experience and can increase the reality of the interaction. For example, where a user interacts with a virtual object in the interactive application, such as a ball, the movement and behavior of the ball can be adapted based on the dense 3D model. If the user kicks the virtual ball towards a wall or other object, the interactive application can modify the behavior of the virtual ball (as shown in the GUI of the application) based on the dense 3D model, such that the ball appears to bounce back from the wall. In another example, if the user kicks the virtual ball towards a smaller (real) object within the room, the ball may not necessarily bounce back but the trajectory of the virtual ball may be changed following its virtual impact with the real object. The characteristics of the particular smaller real object may be used in determining the resultant motion of the virtual ball, as is described in more detail below. Other aspects of the environment may also be incorporated into the interactive application, such as light from real light sources (e.g. the lamp or window in FIG. 1), shadows from objects (e.g. the plant in FIG. 1), etc.

Additionally, the incorporation of the detailed model of the environment into an interactive application (such as a game) may provide new user experiences. For example, a flight simulation game which is played out in the user's own home (e.g. in their living room which has been captured in the first phase) on a miniature scale (e.g. with the user flying in a simulated miniature plane). In another example, an interactive application (such as a game) may transform the room into a jungle or other alternative environment, e.g. with waterfalls rolling off the sofa, etc. In a further example, an interactive application (such as a game) may enable a user to incorporate their own home into a simulation game. In yet another example, the incorporation of the detailed model into an interactive application may enable a user to try out changes to home decoration, new furniture, etc within a virtual representation of the room before actually making the changes (e.g. painting the walls a different color, changing the color of the carpet, knocking down a wall, etc) or buying the new furniture etc. In an implementation, the interactive application may be provided by a home furnishings store (e.g. via their website) such that you can import depth data to be used in creating a model which is integrated within the application and then import items from the store into the virtual scene.

The system shown in FIG. 1 comprises a single depth camera (mobile depth camera 102) and the method shown in FIG. 3 enables a single depth sensing device to be used to create a detailed 3D model of an environment and also to track real-time movement in 3D within a region of that larger environment. This provides a lower cost system than systems which comprise multiple depth sensing devices. The method of FIG. 3 may also be used in combination with a system which comprises multiple depth cameras and this is described in more detail below with reference to FIG. 8.

Figure 4:
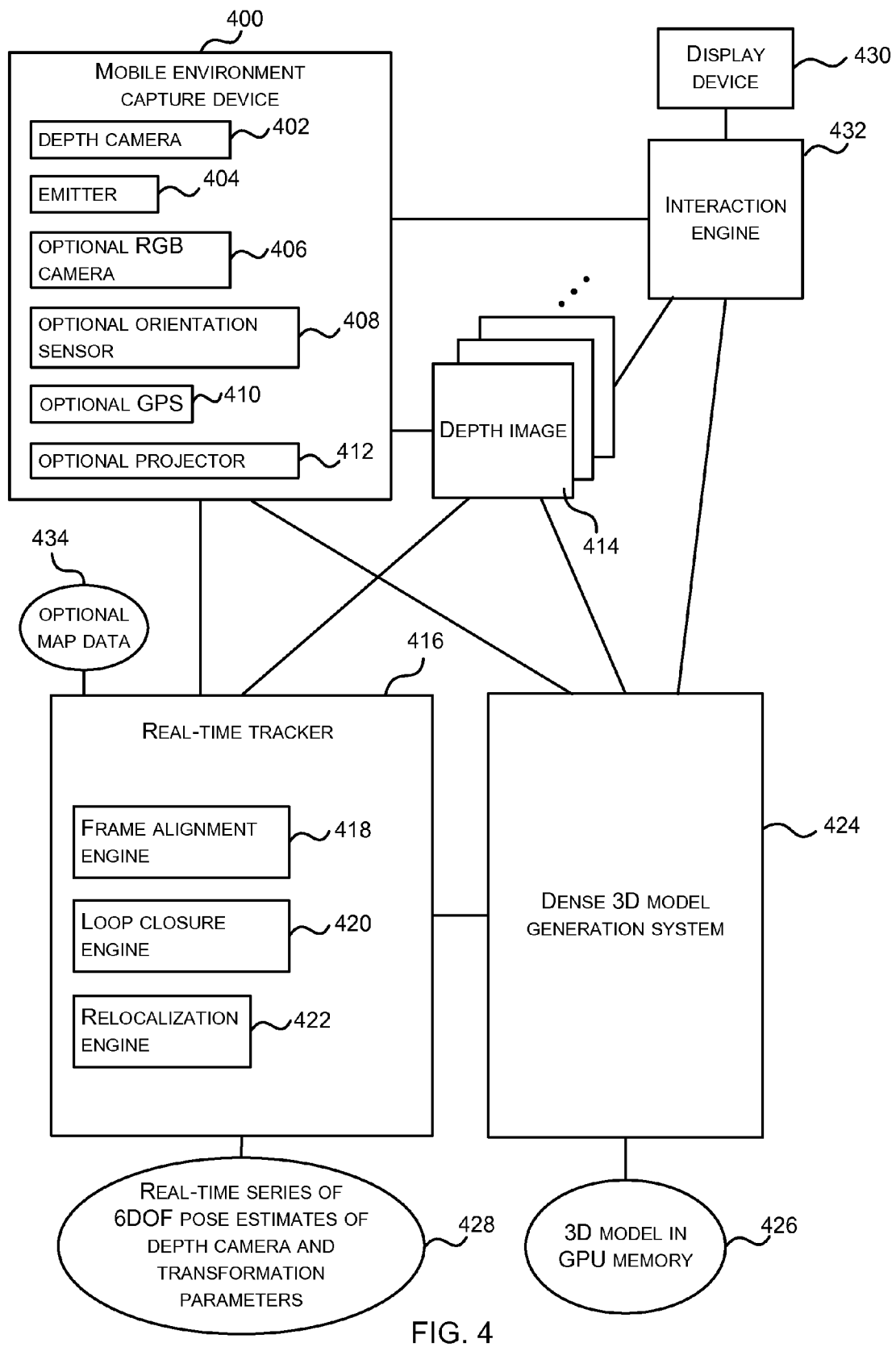
FIGS. 4 and 5 are schematic diagrams of a mobile depth camera connected to an interactive computing system.

FIG. 4 is a schematic diagram of a mobile environment capture device 400 for use with a real-time camera tracker 416, dense model formation system 424 and an integration engine 432 (which may be a game engine). The mobile environment capture device 400 comprises a depth camera 402 which is arranged to capture sequences (or series) of depth images of a scene. Subsequent references to a depth camera may refer to a standalone depth camera or to a depth camera which is part of a mobile environment capture device as shown in FIG. 4. Depending on the technology used for depth sensing the depth camera may require additional components (e.g. an emitter 404 is required where the depth camera 402 detects infra-red structured light patterns) although such additional components may not necessarily be co-located with the depth camera.

Each depth image 414 (or depth map frame) comprises a two dimensional image in which each image element (i.e. pixel) comprises a depth value such as a length or distance from the camera to an object in the captured scene which gave rise to that image element. This depth value may be an absolute value provided in specified units of measurement such as meters, or centimeters or may be a relative depth value. In each captured depth image 414 there may be around 300,000 or more image elements each having a depth value. The frame rate of the depth camera 402 is high enough to enable the depth images to be used for working robotics, computer game or other applications (e.g. 20 frames per second or more).

The depth information may be obtained using any suitable technique including, but not limited to, time of flight, structured light, and stereo images. The mobile environment capture device 400 may also comprise an emitter 404 arranged to illuminate the scene in such a manner that depth information may be ascertained by the depth camera 402.

For example, in the case that the depth camera 402 is an infra-red (IR) time-of-flight camera, the emitter 404 emits IR light onto the scene, and the depth camera 402 is arranged to detect backscattered light from the surface of one or more objects in the scene. In some examples, pulsed infrared light may be emitted from the emitter 404 such that the time between an outgoing light pulse and a corresponding incoming light pulse may be detected by the depth camera and measure and used to determine a physical distance from the environment capture device 400 to a location on objects in the scene. Additionally, in some examples, the phase of the outgoing light wave from the emitter 404 may be compared to the phase of the incoming light wave at the depth camera 402 to determine a phase shift. The phase shift may then be used to determine a physical distance from the mobile environment capture device 400 to a location on the objects by analyzing the intensity of the reflected beam of light over time via various techniques including, for example, shuttered light pulse imaging.

In another example, the mobile environment capture device 400 can use structured light to capture depth information. In such a technique patterned light (e.g. light displayed as a known pattern such as spots, a grid or stripe pattern, which may also be time-varying) may be projected onto a scene using the emitter 404. Upon striking the surface of objects in the scene the pattern becomes deformed from the view point of a depth camera 402 which captures the pattern. The deformation in the captured pattern is analyzed to determine an absolute or relative distance from the depth camera 402 to the objects in the scene.

In another example, the depth camera 402 comprises a pair of stereo cameras such that visual stereo data is obtained and resolved to generate relative depth information. In this case the emitter 404 may be used to illuminate the scene or may be omitted.

In some examples, in addition to the depth camera 402, the mobile environment capture device 400 comprises a color video camera referred to as an RGB camera 406. The RGB camera 406 is arranged to capture sequences of images of the scene at visible light frequencies.

The mobile environment capture device 400 may comprise an orientation sensor 408 such as an inertial measurement unit (IMU), accelerometer, gyroscope, compass or other orientation sensor 408. However, it is not essential to use an orientation sensor. The mobile environment capture device 400 may comprise a location tracking device such as a GPS, although this is not essential.

The mobile environment capture device may comprise a projector 412 as mentioned above, although this is not essential. The mobile environment capture device also comprises one or more processors, a memory and a communications infrastructure as described in more detail below. The mobile environment capture device may be provided in a housing which is shaped and sized to be hand held by a user or worn by a user. In other examples the mobile environment capture device is sized and shaped to be incorporated or mounted on a vehicle, toy or other movable apparatus. The mobile environmental camera may also be shaped so that it can be placed on a surface or bracket when operating in a fixed (or static) position (e.g. in the second phase, box 32 of FIG. 3).

The mobile environment capture device 400 is connected to a real-time tracker 416. This connection may be a physical wired connection or may use wireless communications. In some examples the mobile environment capture device 400 is connected indirectly to the real-time tracker 416 over one or more communications networks such as the internet.

The real-time tracker 416 is computer-implemented using a general purpose microprocessor controlling one or more graphics processing units (GPUs) or other parallel computing units. It comprises a frame alignment engine 418 and optionally a loop closure engine 420 and a relocalization engine 422. The real-time tracker 416 takes depth image frames from the depth camera 402, and optionally also input from the mobile environment capture device 400, and optional map data 434. The real-time tracker 416 operates to place the depth image frames into spatial alignment in order to produce a real-time series 428 of six degree of freedom (6DOF) pose estimates of the depth camera 402. It may also produce transformation parameters for transforms between pairs of depth image frames. In some examples the real-time tracker operates on pairs of depth image frames 414 from the depth camera. In other examples, the real-time tracker 416 takes a single depth image 414 and aligns that with a dense 3D model 426 of the environment rather than with another depth image. An example of a method of real-time tracking is described in co-pending US patent application entitled 'Real-time Camera Tracking Using Depth Maps' filed on the same day as this application. This method is also described briefly below with reference to FIGS. 11 and 12.

The real-time tracker 416 provides the camera pose as output to a dense 3D model generation system 424 which uses that information together with the depth image frames to form and store a dense 3D model 426 of the scene or environment in which the mobile environment capture device 400 is moving. For example, in the case of FIG. 1 the 3D model would be a 3D model of the surfaces and objects in the room. In the case of FIG. 2 the 3D model would be a 3D model of the floor of the building. The dense 3D model may be stored in GPU memory. An example of a method of dense 3D model generation is described in co-pending US patent application entitled 'Three-Dimensional Environment Reconstruction' filed on the same day as this application. This method is also described briefly below with reference to FIGS. 13 and 14. Another example of a method of dense 3D model generation is described in a paper entitled 'A Volumetric Method for Building Complex Models from Range Images' by Curless and Levoy and published at SIGGRAPH '96.

The processing performed by the real-time tracker 416 and/or the dense 3D model formation system 424 can, in one example, be executed remotely from the location of the mobile environment capture device 400. For example, the mobile environment capture device 400 can be connected to (or comprise) a computing device having relatively low processing power, and which streams the depth images over a communications network to a server. The server has relatively high processing power, and performs the computationally complex tasks of the real-time tracker 416 and/or the dense 3D model formation system 424. The server can return a rendered image of the dense reconstruction per-frame to provide an interactive experience to the user, and also return the final dense 3D reconstruction on completion of the model, for subsequent local use (e.g. in a game). Such an arrangement avoids the need for the user to possess a high-powered local computing device.

In order to assist the user with building the dense 3D model, feedback can be provided to the user in the form of real-time renderings of the dense 3D model. This enables the user to view the state of the dense model as it is constructed, thereby assisting the user in capturing regions that have been missed. Colors and/or textures may be superimposed on the renderings in order to indicate to the user which regions of the environment need more data. This provides a more interactive experience for the user. Audio or visual cues can also be provided to the user to guide them to areas that have been missed or are of poor quality in the dense 3D model.

The mobile environment capture device 400 may be used in conjunction with an integration engine 432 (which may be a game engine) which is connected to a display device 430. For example, the game may be a first-person shooter (FPS) game, golf game, boxing game, motor car racing game or other type of computer game. The dense 3D model may be provided to the integration engine 432, and aspects of the model incorporated into the game, as described above with reference to FIG. 3. For example, the 3D model can be used to determine the shape and location of objects in a room which may then be incorporated into the game itself as in-game objects that the player can interact with or virtual objects within the game may interact (virtually) with objects within the environment (e.g. a virtual ball kicked by a player may appear to bounce back after hitting a wall of the room or other object in the environment). The integration engine 432 also uses the depth images captured during the second phase (e.g. during game play, where the integration engine is a game system), to track real-time movement in 3D in the region of interest and to use this movement as an input to an application, such as a game. The tracking of real-time movement using the depth images 414 may be performed using known techniques such as background removal followed by exemplar-based body part recognition (e.g. as described in co-pending US patent application entitled 'Human Body Pose Estimation', filed May 1, 2009, publication number US-2010-0278384-A1. Data from the integration engine 432 such as the game state or metadata about the game may also be provided to the real-time tracker 416.

Map data 434 is optionally available to the real-time tracker 416. For example, this may be an architect's drawing of the environment (e.g. room or floor of building), the location of landmarks known in the environment, a map of the environment available from another source.

The frame alignment engine 418 of the real-time tracker is arranged to align pairs of depth image frames, or a depth image frame and an estimate of a depth image frame from the dense 3D model. It uses an iterative process which is implemented using one or more graphics processing units in order that the frame alignment engine operates in real-time. The loop closure engine 420 is arranged to detect when the mobile environment capture device has moved in a loop so that the scene depicted in the current depth frame is at least partially overlapping with that of a previous depth frame. For example, this may occur when a user walks around the whole floor of the building in FIG. 2 and reaches the starting point again. It may also occur when a user moves around a room behind some furniture and out again to the original start position, or close to that original start position. The relocalization engine 422 is arranged to deal with the situation where the real-time tracker loses the current location of the mobile environment capture device 400 and relocalizes or finds the current location again.

As mentioned, the processing performed by the real-time tracker 416 and/or the dense 3D model generation system 424 can, in one example, be executed remotely from the location of the mobile environment capture device 400. For example, the mobile environment capture device 400 can be connected to (or comprise) a computing device having relatively low processing power, and which streams the depth images over a communications network to a server. The server has relatively high processing power, and performs the computationally complex tasks of the real-time tracker 416 and/or the dense 3D model generation system 424. The server can return a rendered image of the dense reconstruction per-frame to provide an interactive experience to the user, and also return the final dense 3D reconstruction on completion of the model, for subsequent local use (e.g. in a game). Such an arrangement avoids the need for the user to possess a high-powered local computing device.

Figure 5:
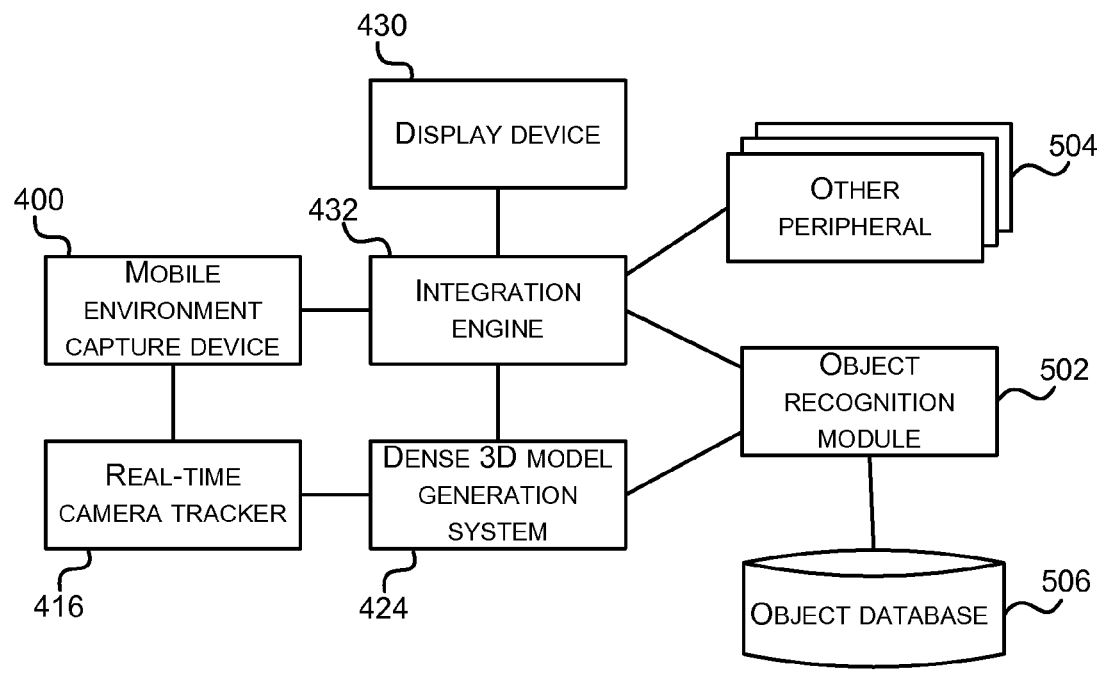

In the system and methods described above, the dense 3D model which is constructed based on the depth images captured while the mobile depth camera is in motion (phase 1, box 31 in FIG. 3) is integrated into an application running on the interactive computing system and then a user may interact with the application (and the environment) through motion which is detected once the mobile depth camera has been set down and is therefore static (phase 2, box 32 in FIG. 3). In some examples, instructions may be provided to the user by the system in relation to how to move the mobile depth camera in phase 1 and in other examples, the user may be free to move the mobile depth camera in any way. In a variation of the system and methods described above, the interactive computing system may also comprise an object recognition module 502 as shown in the schematic diagram of FIG. 5. The objects recognized from within the 3D model by this module 502 may include active objects, such as the display device 430 or other peripherals 504 such as speakers, projectors, light sources etc, and passive objects, such as items of furniture.

Figure 6:
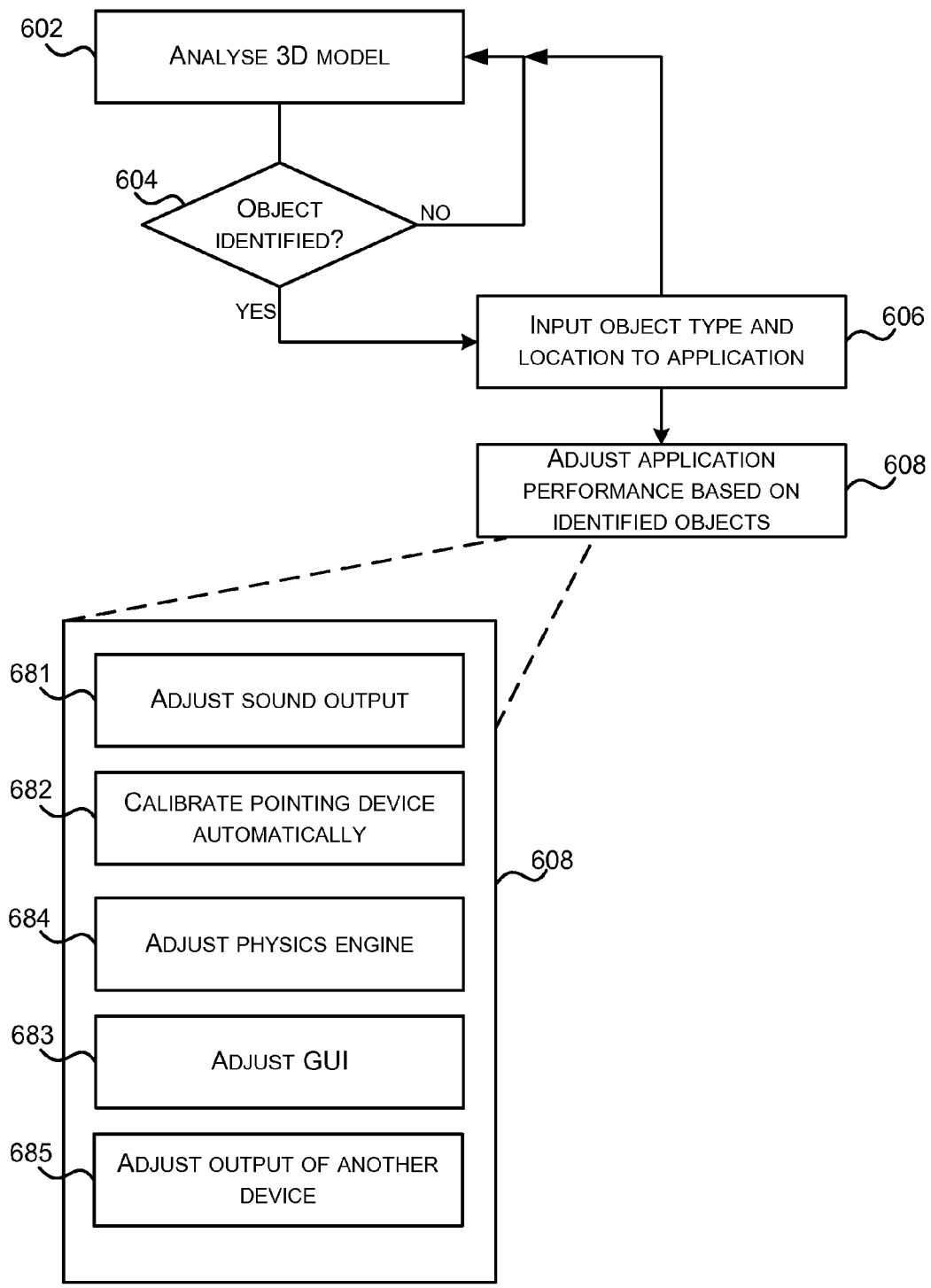
FIG. 6 shows a flow diagram of a part of the operation of the interactive computing system which involves use of the object recognition module shown in FIG. 5.

FIG. 6 shows a flow diagram of a part of the operation of the interactive computing system which involves use of the object recognition module 502. This method may, for example, form part of the step of integrating the 3D model into an application (block 306) in FIG. 3 or may be performed by the integration engine following this step. The 3D model (as generated by the dense 3D model generation system 424) is analyzed (block 602) to look for recognizable objects. This may, for example, be performed by looking for particular features in the generated model or comparing parts of the model to stored templates, where these templates or particular features may be stored in an object database 506. In an example, a generic 'television' template may be stored which defines the approximate shape of a television (e.g. approximately 10 cm in depth and having a width to height ratio of approximately 16:9). Any suitable image analysis or machine-learning method may be used to perform the analysis (in block 602) and in some examples, training data may be stored in the object database 506.

Depending upon the resolution of the dense 3D model, the object recognition module 502 may be able to identify embossed or engraved product logos to assist in object identification (e.g. the DELL (trademark) logo may indicate a computer or computer display). Where the mobile environment capture device 400 comprises an optional RGB camera 406 (as shown in FIG. 4) in addition to the depth camera 402, RGB images may be used in combination with the 3D model to perform object recognition (e.g. for logo detection or to read barcodes or product IDs). Where an object to be recognized comprises a display, such as a television, computer monitor or mobile phone, a known particular pattern may be displayed on the device (and where the device is under the control of the system, this known pattern may be output by the system to the device) while scanning in, so that it can be detected easily in RGB. Similarly, for a projector, similarly, the projector may output a known pattern (optionally varying over time), either independently or under the control of the system, and by finding that RGB pattern in the world, the position of the projector within the room can be determined (e.g. using the room geometry which is known from the depth reconstruction). In some systems, markers (e.g. infra-red reflective markers) may be used to assist in object recognition/classification.

When an object has been recognized ('Yes' in block 604), data about the object is input to the application running on the integration engine 432 (block 606), which may, for example, be a game running on a game system. This data about the object may, for example, comprise an object type (e.g. 'television' or 'display') and location information (e.g. relative to the current position of the mobile depth camera or mobile environment capture device 400). The application performance (or operation) is then adjusted based on the identified objects (block 608).

There are many different ways that the application performance (or operation) may be adjusted based on the identified objects (in block 608) and this may depend upon the type of object which has been identified. Where the object is an active object, such as a speaker, the audio output of the interactive computing system may be adjusted (block 681) to take into consideration to location and spacing of speakers. In this way, the system may be able to simulate the effect of a surround sound system or a real surround sound system may be able to use the full 3D room reconstruction to calibrate and optimize its output. In some examples, where multiple speakers are identified it may be necessary to perform an additional step, such as emitting a sound from each speaker in sequence, to distinguish between the audio outputs from the interactive computing system and the detected speaker objects (the mobile environment capture device 400 may optionally comprise a microphone, not shown in FIG. 4). In some situations, this may not be necessary because this information may be able to be inferred from the size/shape of the detected speaker objects and/or from the relative positioning of the speakers. The detection of speakers and subsequent simulation of surround sound may, for example, be used to increase the reality of a gaming or augmented reality environment.

Another example of an active object is the display device 430 itself and using the knowledge of the relative position of the camera and display, automatic calibration of pointing devices may be performed (block 682), as can be described with reference to FIG. 7. In many known systems, to calibrate a pointing device to a display 702, it is necessary to point (and possibly press a button whilst pointing) at reticules 704 (or other markers) which are displayed in each of the corners of the display, as shown in the upper diagram in FIG. 7. In the system described herein, however, the integration engine knows the relative positions of the depth camera 712, display 714 and pointing device 716 (such as a bat when playing a ball game or an imitation weapon when playing a FPS game) and so the position at which the user is pointing on the display (marked by arrow 718 in the lower diagram in FIG. 7) can be calculated (e.g. using trigonometry), without requiring the initial calibration phase (as shown in the upper diagram of FIG. 7). Furthermore, based on the dense 3D model of the environment which has been generated, the integration engine can also determine what a user is pointing at within the environment, even where the user is not pointing at the display. This may, for example, enable a user to select a real object (e.g. by pointing at it) which is outside of the field of view of the mobile depth camera in its static position (in phase 2) and import it into the game as an in-game object.

Figure 7:
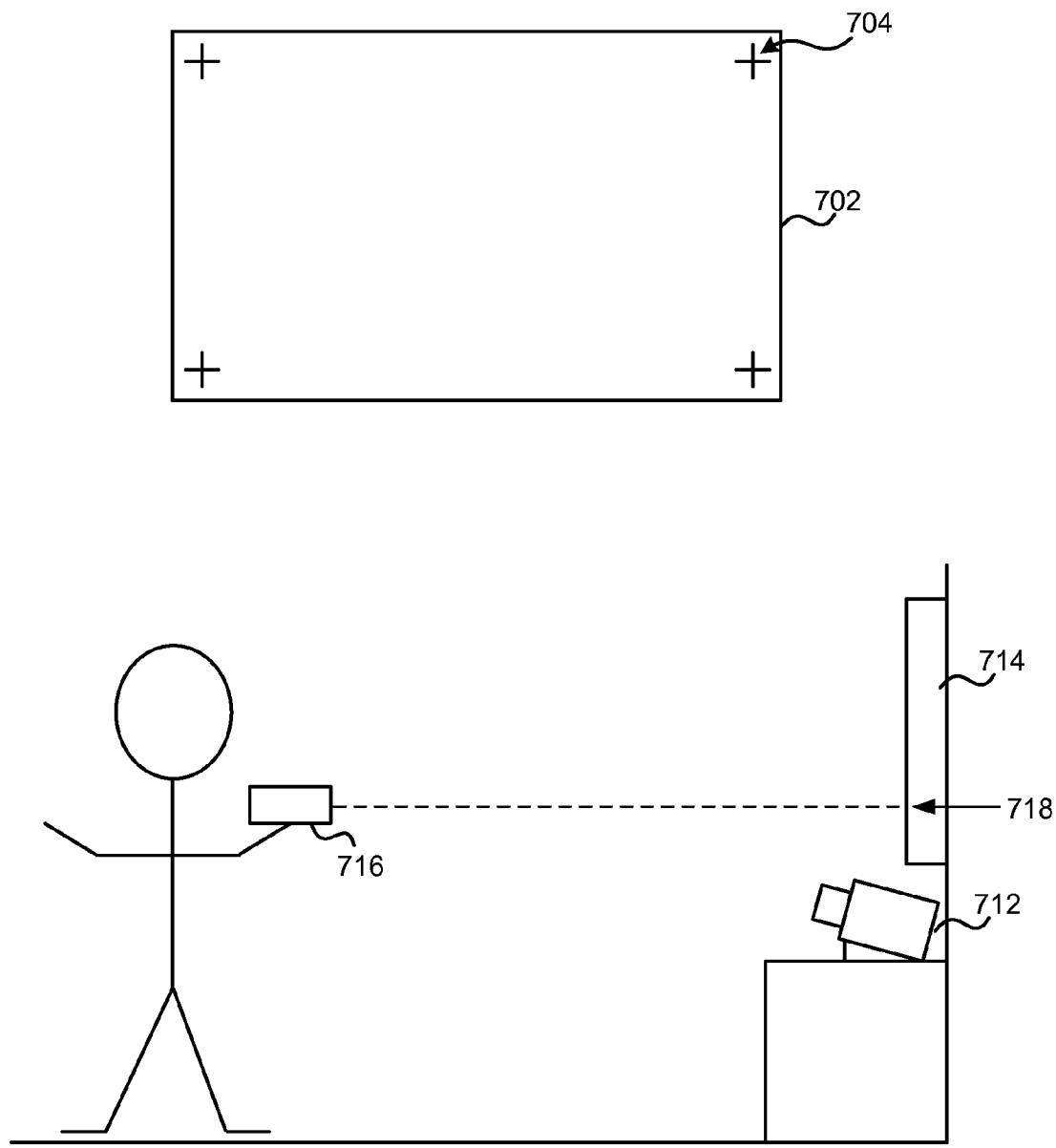
FIG. 7 shows a schematic diagram of both a known method of calibrating a pointing device and an automatic calibration method.

In a variation of that shown in FIG. 7 and described above, the methods may be used to determine where a user is looking within the environment. As the system knows the relative position of the depth camera and the display, as well as the relative position of the user's head and eyes, the system can perform head tracking such that by moving their head a user can look around the GUI. This provides a very realistic and intuitive interface for exploring a virtual environment within a gaming or augmented reality application.

In another example, the GUI of the application may be adjusted based on the identified object (block 683), for example, where a light source (such as the lamp or window shown in FIG. 1) is recognized, the GUI may be adjusted to simulate additional light in the displayed scene originating from the identified location of the light source. Where the detected object is a window, the GUI may be adapted to accommodate any glare which may be anticipated from sunlight through the window (e.g. based on time of day and time of year) or to simulate additional light, as in the previous example.

It will be appreciated that speakers and displays are just two examples of active objects and the system may recognize other active objects and then adjust the output to that active object from the application (in block 608). The output to the active object may be adjusted based on the detected location of that object and/or on the detected position of other objects (in block 685).

In a further example, the device may be an identified active object such as a projector and the output of the projector may be adjusted based on its determined location relative to other objects identified within the environment. This eliminates the need for a calibration stage and means that the system can adapt automatically to calibrate itself based on the detected locations of identified active objects. The projector may project visible images (or other GUI) and these may be adjusted based on the known position of the projector and its relative position to surfaces onto which the images will be projected, e.g. to compensate for surfaces not being flat or being angled with respect to the projector. The images may also be generated for projection based on the known position of the projector to provide a more immersive environment for the user and to extend the display from the main display, which may be a projected display or shown on a television, computer monitor or other display screen. In particular, the projected image may be adapted in real-time to the position of the user (e.g. the position of their face and eyes) such that a 3D effect is achieved and the image may be projected on arbitrary surface geometry.

In another example, the projector may project a structured light pattern for use in depth detection and the structured light pattern projected may be changed (in block 685) based on the known position of the projector, e.g. relative to the current position of the mobile depth camera. In cases where the projection hits a flat surface at an angle the image may be pre-distorted in order to compensate any perspective distortions (also called keystone effect) of the projection image. In an example, the image is pre-distorted in two steps. First, the surface is projectively textured in the captured 3D model with the 2D projection image from a position orthogonal to the center of the projection surface. The textured 3D surface is then projected back to a 2D image using a virtual camera sharing the same extrinsic and intrinsic lens parameters as the projector. The projection may be undistorted relative a user rather than to a flat surface which allows the system to correct distortions on arbitrary non-planar surfaces. The technique described above may be modified by projectively texturing the surfaces (even non-planar) in the captured 3D model from the user's estimated eye position.

The examples described above have all been active objects; however, the application performance may also be adjusted based on the detection of passive objects such as items of furniture or indeed other animate objects (such as the other person 104 or the cat 108 shown in FIG. 1). Where a user is interacting with a virtual object, such as a ball, and throws/kicks this virtual object, a physics engine within the integration engine may be adjusted (block 684) so as to more accurately simulate the interaction between the virtual object and the real object. If a virtual ball bounces off a wall it may move faster than if it had bounced off a softer object such as a sofa (also known as a couch). If the virtual ball accidentally comes into contact with the lamp 106 or the real cat 108 an appropriate sound effect may be simulated by the integration engine and played to the user (e.g. the sound of breaking glass or a cat's 'miaow').

Although object recognition is described above as being performed before the start of game play (or other user interaction in phase 2), object recognition may in addition, or instead, be performed based on the second series of depth images which are generated when the depth camera is static (as received in block 308 of FIG. 3). In such an example, the manner in which a user interacts with an object may be used to recognize or classify an object and this may use exemplar-based body part recognition methods or other methods. For example, an object which a user sits on may be identified by the object recognition module 502 as a chair or sofa.

It will be appreciated that the ways in which an application performance may be adjusted or adapted (in block 608) based on identified objects described above provide just some examples. There are many ways in which adjustments may be made in order to improve user experience and increase the reality of the user interaction with the application once the objects have been identified from the dense 3D model and this information has been fed into the appropriate engine/module.

Figure 8:
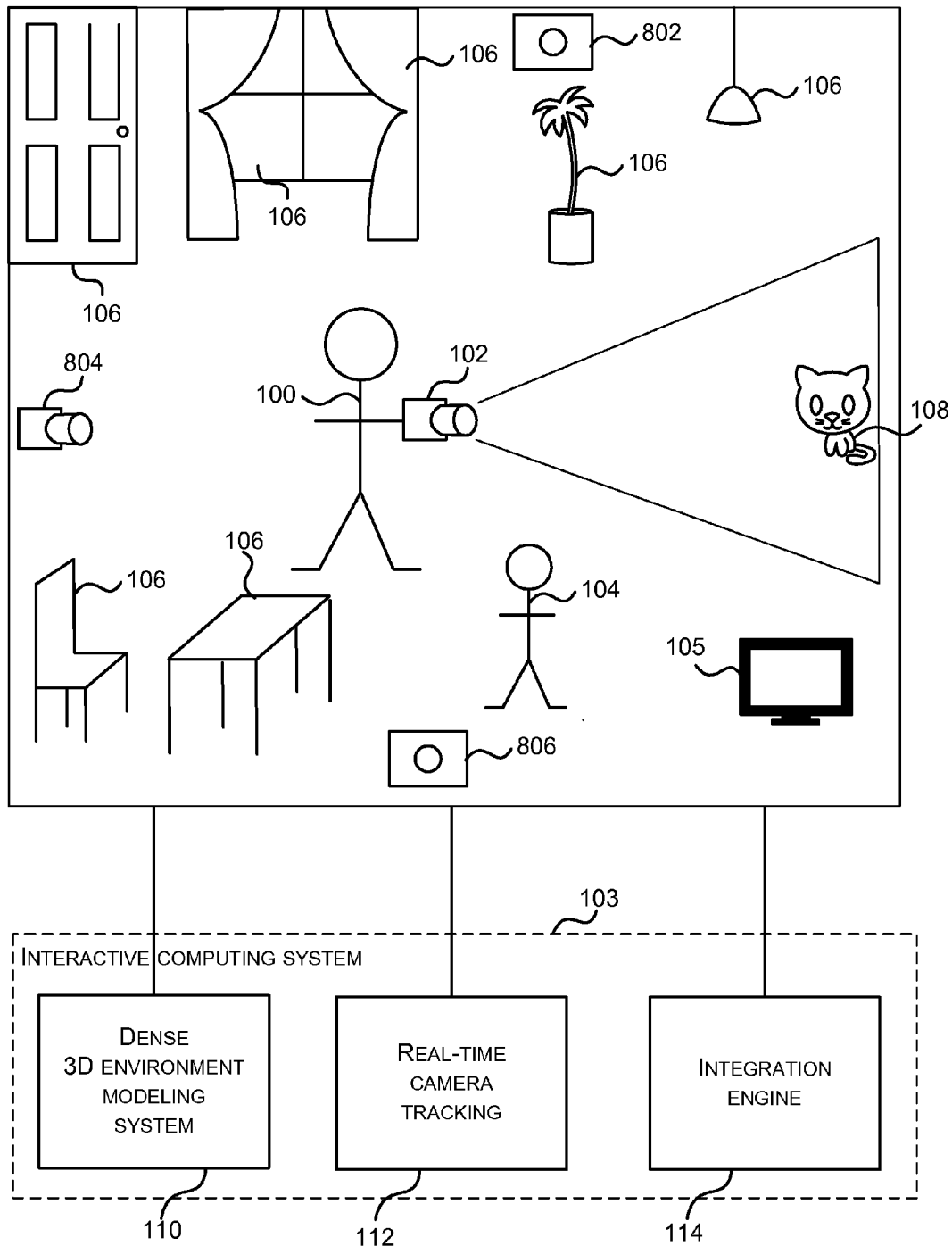
FIG. 8 is a schematic diagram of an arrangement similar to that shown in FIG. 1 but with multiple depth cameras.

The systems described above comprise only a single depth camera, the mobile depth camera 102, 204, 402, however, other example systems may also comprise one or more additional depth cameras 802-806, as shown in FIG. 8, and in such an example system the methods described above (e.g. as shown in FIGS. 3 and 6) may also be used. Each of the depth cameras 102, 802-806 in the system may be the same or they may be different (e.g. they may have different shaped fields of view, they may include combinations of wide-angle, short-throw and long-range depth cameras and/or they may include cameras using different technologies, such as structured light, time of flight, stereo, laser range finders, etc). The additional depth cameras 802-806 may be static cameras and therefore may have a different shaped housing to the mobile depth camera 102, or one or more of the additional depth cameras 802-806 may also be a mobile depth camera. Each depth camera is connected to the interactive computing system using a wired or wireless connection.

In an implementation of such a system, the mobile depth camera 102 alone may be used to generate the dense 3D model of the environment (in block 304 of FIG. 3) or series of images received from multiple depth cameras may be used. Furthermore, in the second phase (box 32), images from all the depth cameras 102, 802-806 or a subset of the cameras may be used to track real-time movement in 3D (in block 310 of FIG. 3). In an example, separate real-time body part recognition is run for each depth camera and the result of the tracker with the highest confidence value is used in order to compensate occlusions of the user resulting from furniture, other users or themselves.

In an implementation of a system comprising multiple depth cameras, such as shown in FIG. 8, the method shown in FIG. 6 may be used to detect the presence and location of the additional depth cameras 802-806 and to adjust the application performance based on their determined locations (in block 608 of FIG. 6). Additionally each static camera may track the user individually in order to determine its relative orientation to the user. This knowledge may be used to resolve any ambiguities regarding the location of the cameras with respect to other static cameras. In this example, adjusting the application performance may comprise performing an automatic calibration of the system based on the known camera locations and this calibration may be used when detecting motion in real-time (e.g. in the second phase of operation, box 32 in FIG. 3, where series of images from multiple depth cameras are used).

Where the depth cameras are not identical, the object recognition (of FIG. 6) may be used to detect the type of camera in addition to the presence and location of the camera. As described above, where the mobile depth camera is part of a mobile environment capture device which also comprises a RGB camera (e.g. as shown in FIG. 4), images captured by the RGB camera may also be used in identification of the type of camera. In other examples, other characteristics may be used to identify the type of camera, such as a particular marker or label on the device (e.g. an IR reflective marker).

Figure 9:
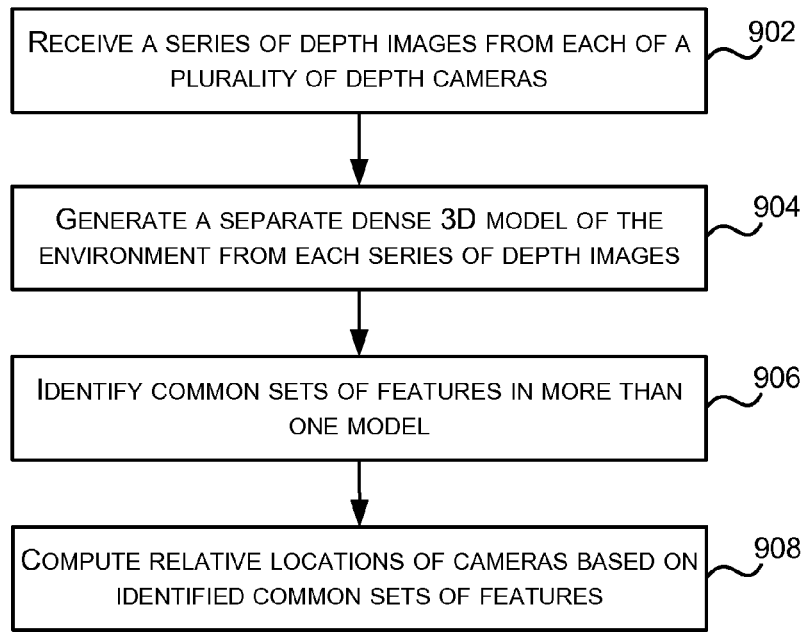
FIG. 9 is a flow diagram of an example method of automatic calibration of multiple depth cameras.

In another variation, the automatic calibration based on the determined locations (or relative locations) of the multiple depth cameras may be performed by comparison of 3D models. FIG. 9 is a flow diagram of an example method of automatic calibration of multiple depth cameras in which a separate dense 3D model is generated (in block 904) using the series of depth images received from each depth camera (in block 902), which includes the mobile depth camera where there one. The models may be generated using all the images in a series or from a subset of the images (e.g. to reduce the computation that is required). Once generated, the individual models are then compared to identify common sets of features which are visible in more than one model (block 906) and based on the identification of a common set of features in two or more models, the relative positions of the cameras associated with each of the models can be computed (block 908). In an example, where the environment comprises a cluttered surface, such as a coffee table with a number of objects on it, such a feature provides a good reference point for computing the relative position of cameras as there is likely to be little or no symmetry in the arrangement of objects. In an implementation of the method shown in FIG. 9, the identification of a common set of features may be implemented by identifying a particular arrangement of features in a first model (such as the cluttered coffee table) and then examining each other model to determine if the same arrangement of features is visible in the model. In an example implementation, descriptor vectors may be extracted at sparse interest points from each of the models and these are then matched to give initial correspondences between the different models. Finally some optimization over the transformation between the frames of reference (e.g. between two frames of reference where two models are being compared) is performed to bring them into alignment.

Figure 10:
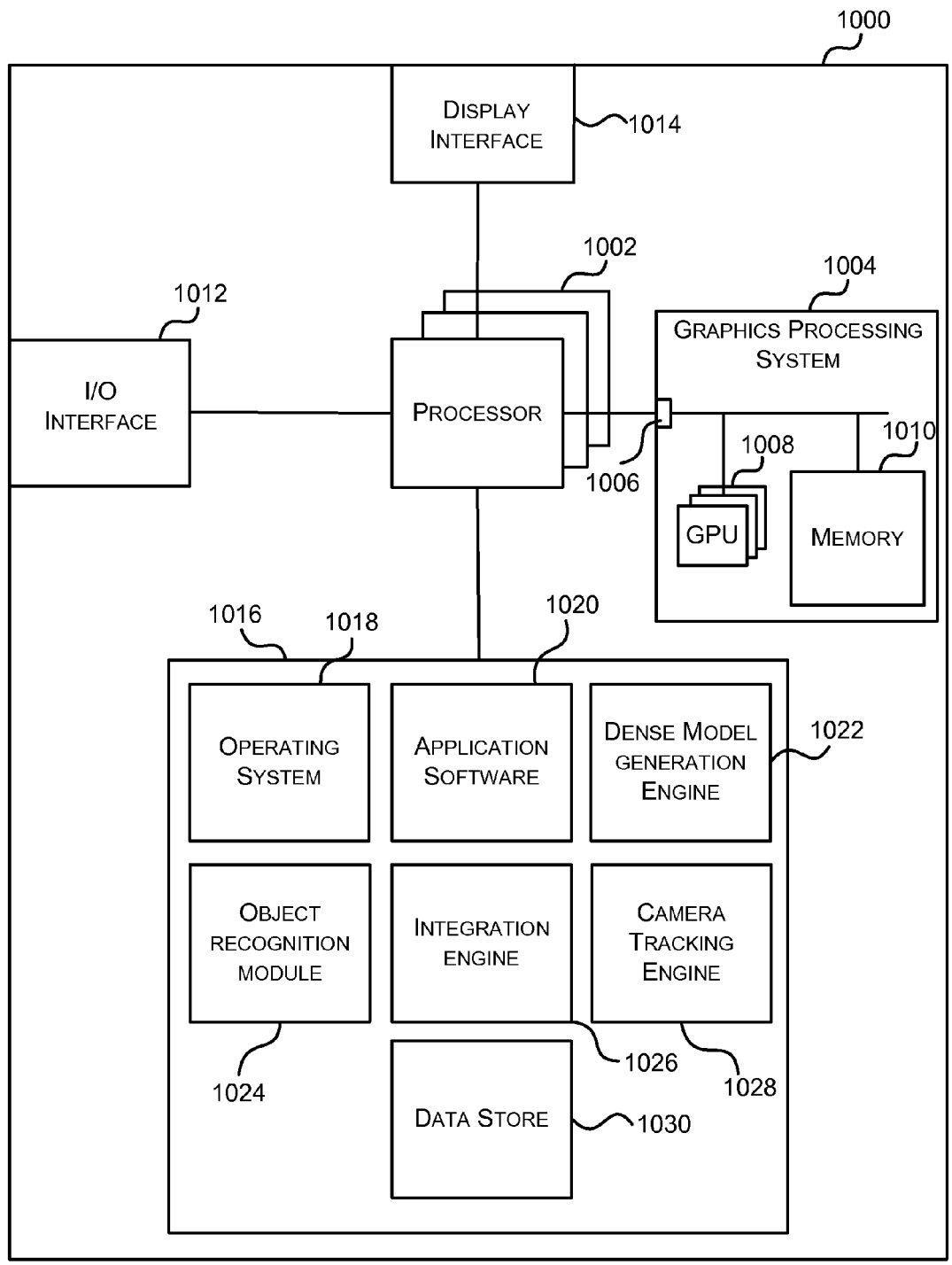
FIG. 10 illustrates an exemplary computing-based device in which embodiments of the methods described herein may be implemented.

FIG. 10 illustrates various components of an exemplary computing-based device 1000 which may be implemented as any form of a computing and/or electronic device, and in which embodiments of the methods described herein may be implemented.

Computing-based device 1000 comprises one or more processors 1002 which may be microprocessors, controllers or any other suitable type of processors for processing computing executable instructions to control the operation of the device in order to generate a dense 3D model of the environment from a first series of depth images, to use at least a part of that model in an application and to track real-time movement in a part of the environment from a second series of depth images for use as an input to the application. In some examples, for example where a system on a chip architecture is used, the processors 1002 may include one or more fixed function blocks (also referred to as accelerators) which implement a part of the methods described herein in hardware (rather than software or firmware).

The computing-based device 1000 may also comprise a graphics processing system 1004, which communicates with the processors 1002 via a communication interface 1006 and comprises one or more graphics processing units (GPUs) 1008 which are arranged to execute parallel, threaded operations in a fast and efficient manner. The graphics processing system 1004 also comprises a memory device 1010 which is arranged to enable fast parallel access from the GPUs 1008. In examples, the GPUs may be used in generating the dense 3D models, as described in more detail below.

The computing-based device 100 also comprises an input/output (I/O) interface 1012 arranged to receive and process input from one or more devices, such as the mobile environment capture device (comprising a depth camera), depth camera, and optionally one or more user input devices (e.g. a games controller, mouse, keyboard etc). The I/O interface 1012 may also operate as a communication interface, which can be arranged to communicate with one or more communication networks (e.g. the internet).

A display interface 1014 is also provided which is arranged to output display information to a display device which may be separate from or integral to the computing-based device 1000. The display information may provide a graphical user interface, e.g. a graphical user interface for the application into which at least a part of the dense 3D model has been integrated. In an embodiment the display device may also act as a user input device if it is a touch sensitive display device and in such an instance the I/O interface 1012 and display interface 1014 may be combined into a single interface or the display device may be connected via both interfaces.

The computer executable instructions may be provided using any computer-readable media that is accessible by computing based device 1000. Computer-readable media may include, for example, computer storage media such as memory 1016 and communications media. Computer storage media, such as memory 1016, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 1016) is shown within the computing-based device 1000 it will be appreciated that the storage may be distributed or located remotely and accessed via a network or other communication link (e.g. using I/O interface 1012).

Platform software comprising an operating system 1018 or any other suitable platform software may be provided at the computing-based device to enable application software 1020 to be executed on the device. The memory 1016 may also store executable instructions to implement the functionality of one or more of the dense model integration engine 1022, object recognition module 1024, integration engine 1026 (e.g. a games engine) and camera tracking engine 1028. The memory may also provide a data store 1030 which can be used to provide storage for data used by the processors 1002 e.g. to store the received series of depth images, to store the generated dense 3D models, to store data used in performing object recognition (e.g. to provide the object database 506 shown in FIG. 5), etc.

Co-pending US patent application entitled 'Real-time Camera Tracking Using Depth Maps' filed on the same day as this application, as referenced above in discussion of FIG. 4, describes a method of real-time camera tracking using the depth maps generated by a depth camera and aspects of this method can be described with reference to FIGS. 4, 11 and 12. In an example implementation, the frame alignment engine 418 of FIG. 4 is computer implemented at a computing device having one or more GPUs 416 or other parallel computing units. For example, the parallel computing units may be vector processors, single instruction multiple data (SIMD) architectures, graphics processing units or other parallel computing devices. It comprises an iterative closest point process and an optional plane extraction component. The iterative closest point process uses projective data association and a point-to-plane error metric. The frame alignment engine receives the current depth map from the depth camera. This is also referred to as the destination depth map. In some examples it also receives a source depth map which is the previous depth map frame from the depth camera. In other examples, the frame alignment engine takes a dense surface model estimate of the source depth map. The output of the frame alignment engine is a set of registration parameters of a transform for aligning the current and source frames (or frame estimate) and these parameters may be computed using the method shown in FIG. 11. In some examples these registration parameters are provided as an SE3 matrix (which is described in more detail below); however, the registration parameters may be provided in any suitable form. These registration parameters are used by the real time tracker 416 to produce the real-time series of 6 degree of freedom pose estimates of the depth camera.

Figure 11:
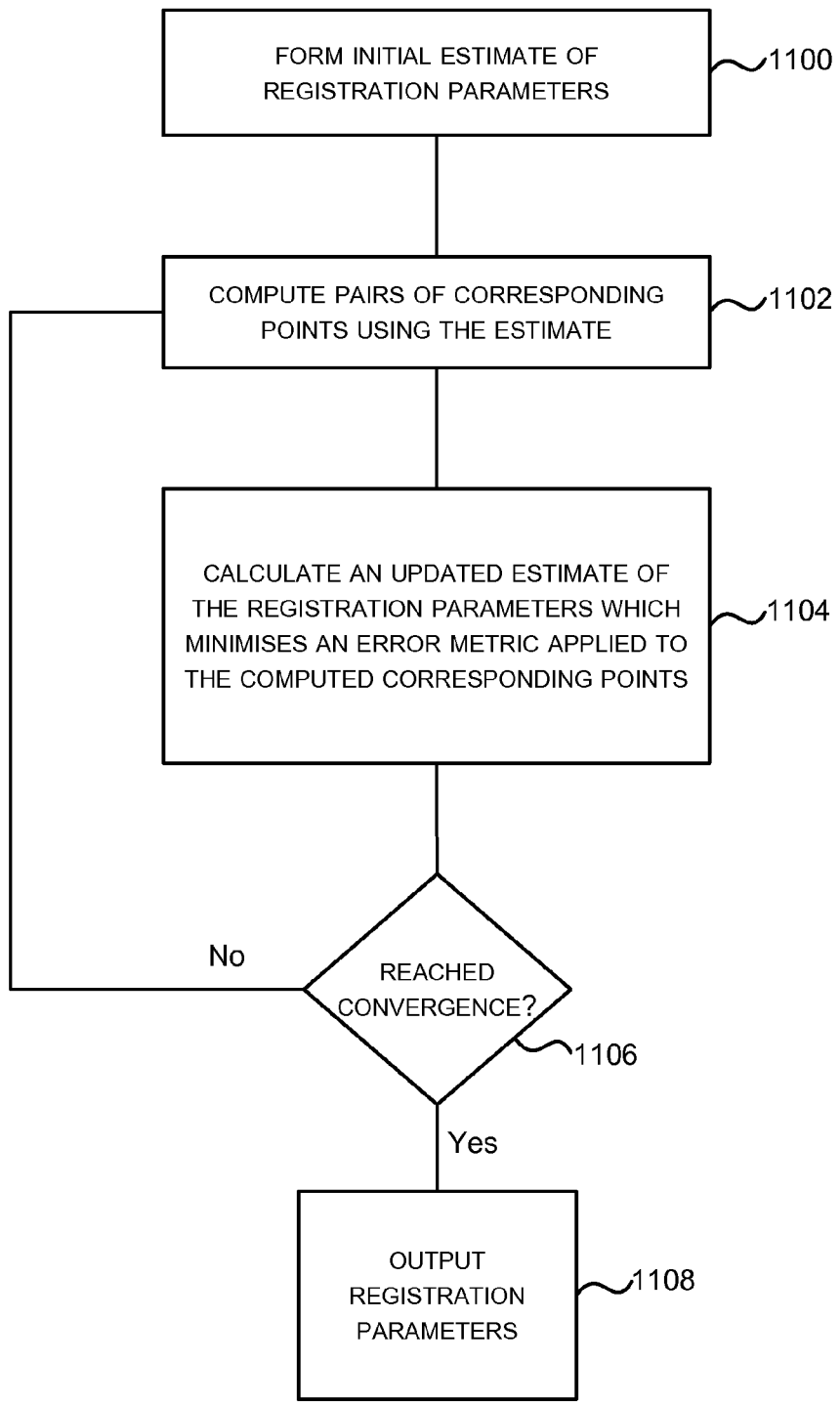
FIG. 11 is a flow diagram of an example iterative process at a frame alignment engine.

FIG. 11 is a flow diagram of an example iterative process at a frame alignment engine. An initial estimate of the registration parameters is formed 1100. These are the registration parameters of a transform for aligning the current and source frames. This initial estimate is formed in any suitable manner. For example, one or more of the following sources of information may be used to form the initial estimate: game state, game meta data, map data, RGB camera output, orientation sensor output, GPS data, etc. In another example, the initial estimate is formed by predicting where the camera is using information about the previous motion path of the camera. For example, the camera may be assumed to have a constant velocity or a constant acceleration. The motion path of the camera from time 0 to time t−1 may be used to estimate where the camera will be at time t and thus obtain an estimate of the registration parameters.

Using the initial estimate, pairs of corresponding points between the current and source frames (depth maps or estimated depth maps) are computed 1102. A pair of corresponding points is a point from one depth map and a point from another depth map, where those points are estimated to have arisen from the same real world point in a scene. The term "point" is used here to refer to a pixel, or a group or patch of neighboring pixels. This correspondence problem is very difficult because of the huge number of possible combinations of points. Previous approaches using color or grey-scale images have addressed this problem by identifying shapes such as lines, edges, corners or the like in each image and then trying to match those shapes between the pair of images. In contrast, the method shown in FIG. 12 and described below identifies corresponding points without the need to find shapes in the depth maps. An updated estimate of the registration parameters is calculated 1104 which optimizes an error metric applied to the computed corresponding points. A check is made to assess whether convergence has been reached 1106. If so, there is little or no change in the updated estimate and the registration parameters are output 1108. If not, the iterative process repeats as indicated in FIG. 11.

Figure 12:
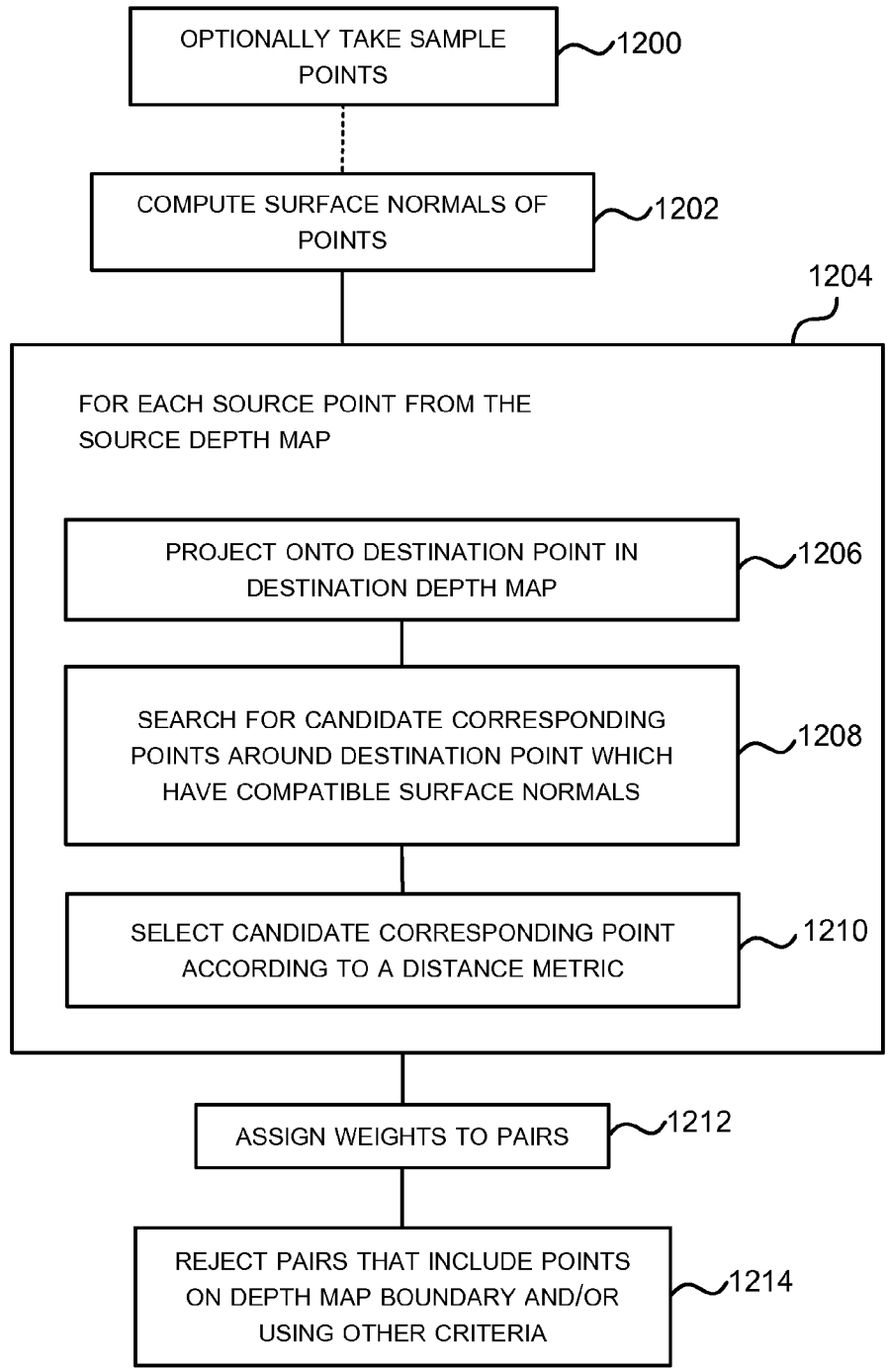
FIG. 12 is a flow diagram showing the step of calculating pairs of corresponding points in more detail.

With reference to FIG. 12 more detail is now given about how the pairs of corresponding points are calculated. Surface normals of each available point are computed (block 1202) and in an example this is achieved for a given point by finding the two (or more) nearest neighbor points in the depth map and computing a surface patch which incorporates those neighbors and the point itself. A normal to that surface patch is then calculated at the location of the point.

A process of finding corresponding pairs of points is then followed (block 1204). This is now described in the case that the source and current depth maps are available without the use of a dense 3D model. For each sampled source point from the source depth map, a ray is projected (block 1206) from the camera location associated with the source depth map, through the sampled source point and onto a destination point in the destination depth map. In some cases the destination point may be in front of the sampled source point along the projected ray. This projection process may be referred to as "projective data association". A search (block 1208) is then made for candidate corresponding points around and including the destination point. For example, the search is for points which have surface normals that are compatible with the surface normal of the sampled source point and which are within a specified Euclidean distance of the destination point. Surface normals are said to be compatible if they are within a specified range of one another. For example, this specified range and the Euclidean distance may be user configurable and/or set using empirical data relating to the particular application conditions concerned.

One or more candidate corresponding points are found as a result of this search (in block 1208). From those candidate corresponding points a single point is selected (in block 1210) to form a pair with the source point. This selection is made on the basis of a distance metric. For example, a Euclidean distance is calculated between the source point and each of the candidate corresponding points. The pair which gives the smallest Euclidean distance is then selected. The process of block 604 is then repeated for each of the sampled source points or in the case that no sampling is done, for each of the available points of the source depth map.

In some embodiments weights are assigned (in block 1212) to each of the pairs of corresponding points. For example weights may be assigned using information from other sources such as an RGB camera or other sensors. In an example, a weight related to measurement characteristics of the depth camera such as radial lens distortion and/or depth dependent error is computed and stored with each of the pairs of corresponding points. In another example, pairs that include a point which is at an edge detected in the depth map using an edge detection algorithm are weighted higher than other pairs. These weights may be used during the process of applying the error metric in order to improve the quality of the results. For example, weights related to depth dependent error enable high depth values which are likely to fluctuate a lot due to the lack of precision to be taken into account.

In some embodiments pairs that include a point which is on or near a depth map boundary are rejected (block 1214). This helps to avoid errors where overlap between the two depth maps is only partial. Other criteria may also be used to reject pairs. For example, in some embodiments plane extraction is carried out and in that case, pairs which are on a plane may be rejected in order to prevent the tracker being biased by a large plane and so ignoring smaller but unique parts within a depth map.

In some embodiments sample points are taken (in block 1200) from either or both of the current and source depth maps and those sample points are used as candidates to find pairs of corresponding points from. In such an embodiment, surface normals are computed (in block 1202) for each sampled point instead of each available point and then the process of block 1204 is implemented for each sampled source point. Sampling may be achieved by randomly selecting a specified proportion of the points. In another embodiment sampling (in block 1200) is achieved in a manner which takes into account surface normals of the points and may therefore be performed after block 1202. For example, a surface normal is calculated for each point (in block 1202) and a histogram created with a plurality of bins for different ranges of surface normal values. Sampling is carried out so that a uniform sampling across the bins is achieved.

Co-pending US patent application entitled 'Three-dimensional environment reconstruction' filed on the same day as this application, as referenced above in discussion of FIG. 4, describes a method of building up a 3D model of a real-world environment from data describing camera location and orientation and the depth maps generated by a depth camera and aspects of this method can be described with reference to FIGS. 4, 13 and 14.

Figure 13:
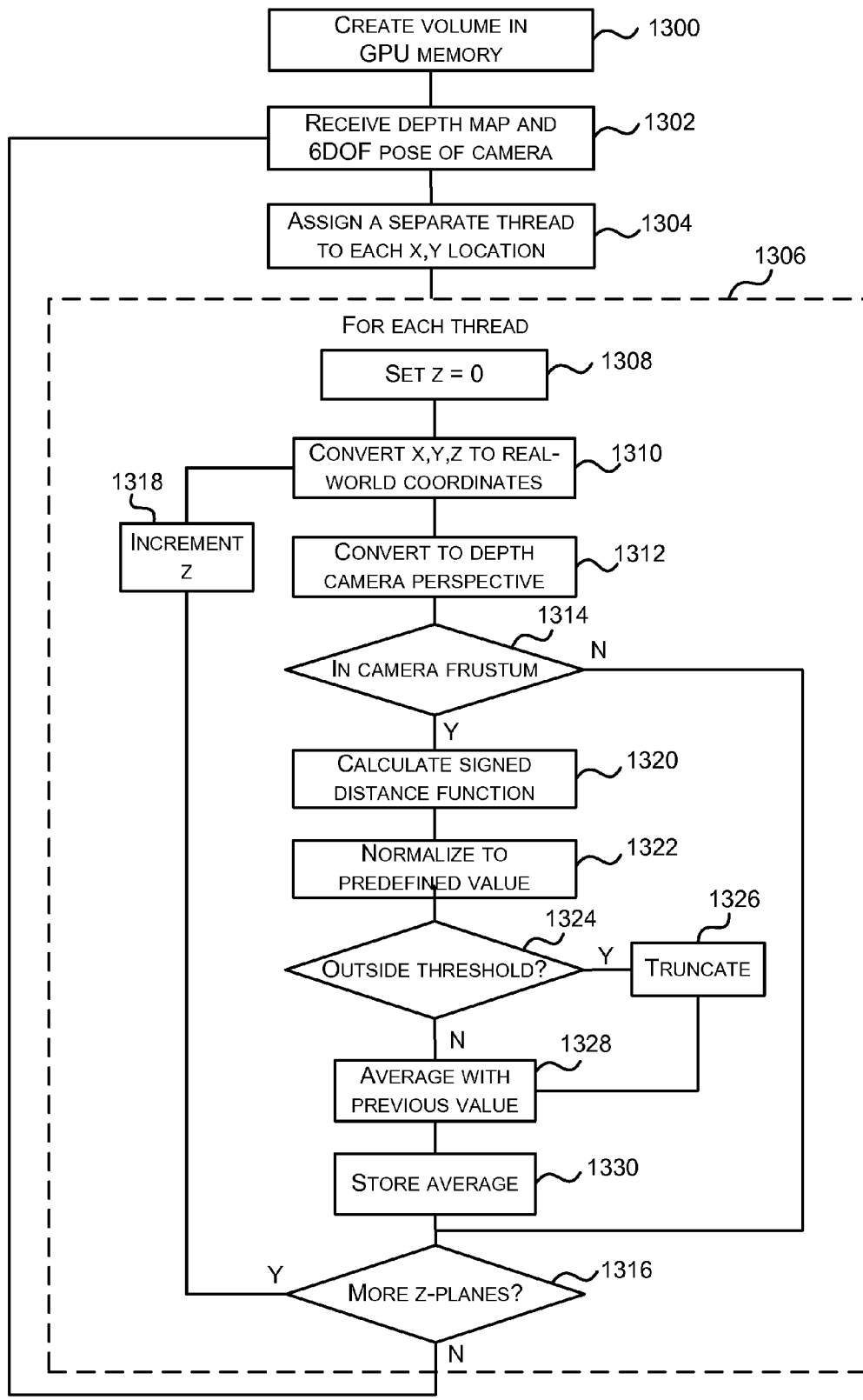
FIG. 13 is a flow diagram of an example of a parallelizable process for generating a 3D environment model.

FIG. 13 shows a flowchart of an example of a parallelizable process for generating a 3D environment model. In one example, the process of FIG. 13 is executed on a GPU processor, a multi-core processor, or other type of processor allowing a high degree of execution parallelism. In a further example, a single-core processor can also be used, if it is sufficiently fast. Firstly, a 3D volume is created (in block 1300) on a memory device for storing the model. In one example, the 3D volume is created on the memory of a graphics processing system (e.g. system 1004 in FIG. 10), which enables fast, parallel access from a GPU.

The 3D volume can be visualized as a cuboid of memory, wherein each memory location is a voxel representing a point in space of the environment being modeled. Therefore, the 3D volume directly represents a spatial portion of the real-world environment. As the 3D volume corresponds directly to a real-world volume, the size of the real-world volume represented in a fixed-size memory determines the model resolution. For example, if a large real-world volume is to be modeled, then each voxel of the memory represents a larger region in real-world space, and hence the resolution is lower than if a smaller real-world volume is modeled. If more memory is available, however, the large real-world volume can be modeled at a higher resolution.

Once the 3D volume has been created in memory (in block 1300), then the modeling process starts by receiving (in block 1302) from the mobile environment capture device 400 a depth image 414 and the 6DOF pose estimate of the depth camera 402 when capturing that depth image. The 6DOF pose estimate indicates the location and orientation of the depth camera 402, and can be provided by the real-time tracker 416. In one example, the 6DOF pose estimate can be in the form of an $SE_3$ matrix describing the rotation and translation of the depth camera 402 relative to real-world coordinates. More formally, this transformation matrix can be expressed as:

$$T_k = \begin{bmatrix} R_k & t_k \\ 0^T & 1 \end{bmatrix} \in SE_3$$

Where $T_k$ is the transformation matrix for depth image frame k, $R_k$ is the camera rotation for frame k, $t_k$ is the camera translation at frame k, and Euclidean group $SE_3 := \{R, t | R \in SO_3, t \in \epsilon^3\}$. Coordinates in the camera space (i.e. from the camera perspective) can be mapped to real-world coordinates by multiplying by this transformation matrix.

A separate execution thread can be assigned (in block 1304) to each voxel in a plane of the 3D volume. For example, if the plane of the volume is the z-plane, then an execution thread is assigned to each combination of x- and y-coordinate of the 3D volume. Each separate execution thread then performs the same operations, as indicated by dotted box 1306 in FIG. 13. The operations performed by each thread are illustrated diagrammatically in FIG. 14. FIG. 14 shows a top-down view of the 3D volume 1400 (i.e. showing the x-axis 1420 and z-axis 1422, and the y-axis is ignored for the purposes of clarity). An execution thread is assigned to each coordinate on the z-plane of the volume, denoted $T_1$ 1402, $T_2$ 1404, ... $T_{n-1}$ 61406, $T_n$ 1408. The operations performed by each thread in box 1306 are firstly illustrated with reference to $T_1$ 1402.

The z-coordinate for the execution thread is set (in block 1308) to zero, and the x,y,z coordinates for the voxel associated with the thread are converted (in block 1310) to real-world coordinates. For example, in the case of thread $T_1$ 1402, the x,y coordinate associated with the thread is (0,0), so when the z-coordinate is set to zero, this gives coordinates of (0,0,0) (i.e. voxel 1410 in FIG. 14) which can be converted to real-world coordinates. Once the real-world coordinates for voxel 1410 have been determined, they can be transformed using the 6DOF location and orientation of the depth camera to determine a corresponding location in the depth image 414 for this voxel. This means that the real-world coordinate for the current voxel associated with the thread is perspective projected through the depth camera's projection. In other words, if the voxel representing this point in the real-world is being viewed by the depth camera having its location and orientation, this determines what the coordinates are in the depth image 414 for that point. The depth camera-perspective coordinates for the voxel are denoted pX, pY, pZ. The depth camera-perspective coordinates can be converted to depth image pixel coordinates (denoted u,v) by u=pX/pZ and v=pY/pZ.

Figure 14:
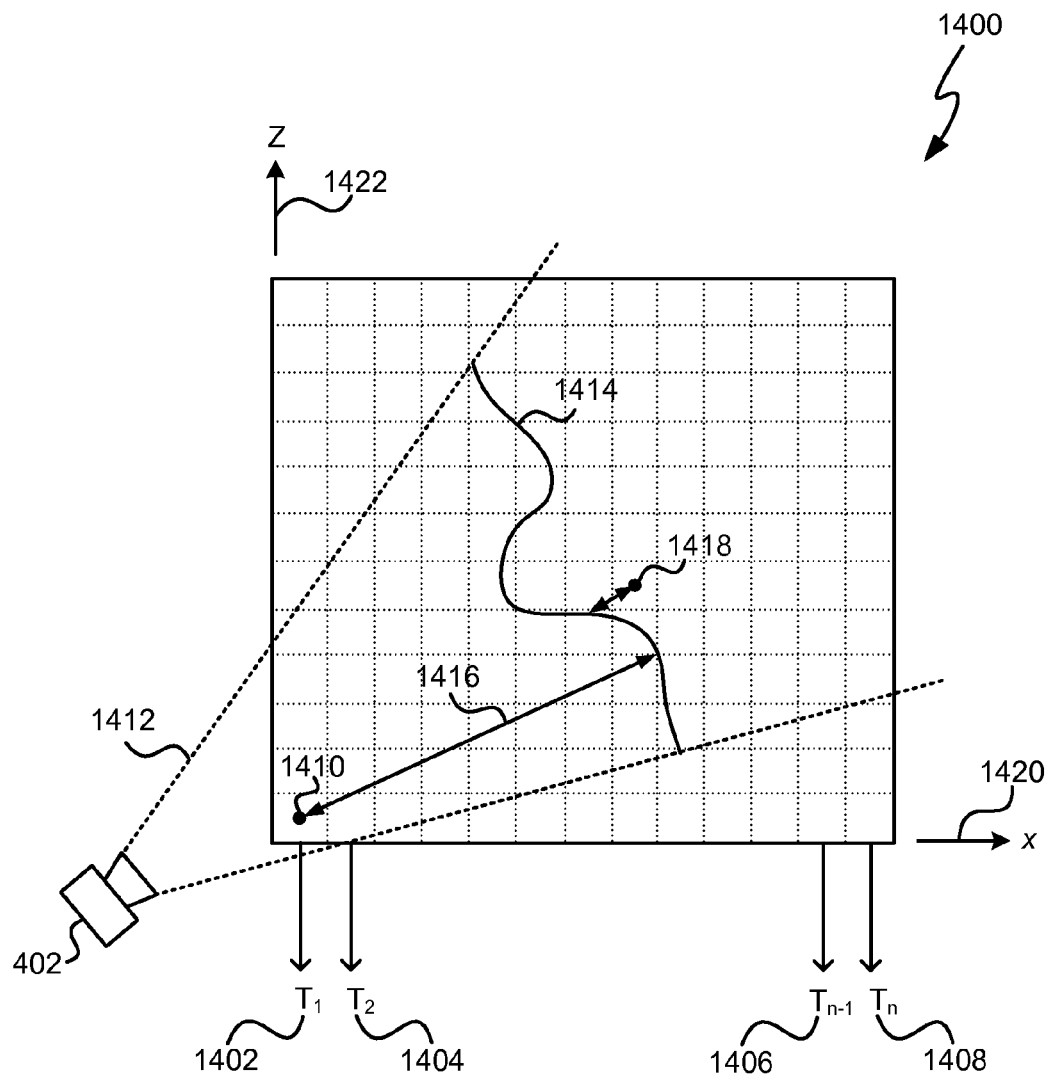
FIG. 14 illustrates and example parallelizable signed distance function calculation.

The perspective of the depth camera 402 is shown illustrated in FIG. 14 by the dashed lines indicating the frustum 1412 of the depth camera 402. FIG. 14 also shows a surface 1414 in the depth image 414 output from the depth camera.

The depth image coordinates (u,v) for the voxel currently associated with the thread are used to determine (in block 1314) whether the voxel is located within the frustum 1412 of the depth camera. If not, then this voxel can be skipped. With reference to FIG. 14, it is noted that, in the case of thread $T_1$, the current voxel 1410 is within the frustum 1412 of the camera. This can be contrasted to, for example, the first voxel considered by thread $T_{n-1}$, which is outside the camera frustum 1412, and hence skipped.

If it is determined that the current voxel is within the camera frustum 1412, then a factor relating to the distance between the voxel and a point in the environment at the corresponding location to the voxel from the camera's perspective is determined. The point in the environment at the corresponding location can be given by the depth value in the depth image at (u,v). Therefore, with reference to FIG. 14, this factor considers distance 1416 between voxel 1410 and the point on surface 1414 in the depth image 414 that maps onto the voxel 1410.

In one example, the factor calculated (in block 1320) is a signed distance function. A signed distance function calculation gives the value of the distance between the current voxel and the corresponding point in the depth image 414, and is signed such that voxels outside (i.e. external to) the corresponding point in the depth image (from the camera's perspective) are given a positive distance, and voxels inside (i.e. internal to) the corresponding point in the depth image (from the camera's perspective) are given a negative distance. A value of zero indicates that the associated voxel is exactly coincident with the corresponding point. The signed distance function can be calculated readily from the depth value at (u,v) in the depth image minus pZ. For example, voxel 1410 in FIG. 14 is in front of the corresponding point on surface 1414, and hence has a positive signed distance function value. Conversely, voxel 1418 in FIG. 14 is behind its corresponding point on surface 1414, and hence has a negative signed distance function value.

The signed distance function value is then normalized (in block 1322) to a predefined distance value. In one example, this predefined value can be a small distance such as 5 cm, although any suitable value can be used. It is then determined (in block 1324) whether the normalized distance is greater than a positive threshold value (if the signed distance is positive) or less than a negative threshold value (if the signed distance is negative). If so, then the signed distance function values are truncated (in block 1326) to maximum or minimum values. For example, if the normalized distance is greater than the positive threshold value, then the value can be truncated at +1 (the positive threshold value after normalizing), and if the normalized distance is less than the negative threshold value, then the value can be truncated at −1 (the negative threshold value after normalizing). The result of this calculation is known as a truncated signed distance function (TSDF).

For example, referring to FIG. 14, voxel 1410 is a relatively large distance outside surface 1414, and hence may be truncated to +1. Conversely, voxel 1418 is a relatively short distance inside surface 1414, and hence may not be truncated, and keep its normalized distance (e.g. −0.6 for example).

The normalized (and if appropriate, truncated) signed distance function value is then combined with any previous value stored at the current voxel. In the case that this is the first depth image incorporated into the 3D volume, then no previous values are present. However, as further frames from the depth camera are received and incorporated, then values can already be present at a voxel.

In one example, the signed distance function value is combined with a previous value by averaging (block 1328). This can assist with building models of environments with moving objects, as it enables an object that has moved to disappear over time as the measurement that added it becomes older and averaged with more recent measurements. For example, an exponentially decaying moving average can be used. In another example, the average can be a weighted average that uses a weighting function relating to the distance of the associated voxel from the depth camera. The averaged signed distance function values can then be stored (in block 1330) at the current voxel.

In an alternative example, two values can be stored at each voxel. A weighted sum of the signed distance function values can be calculated and stored, and also a sum of the weights calculated and stored. The weighted average can then be computed as (weighted sum)/(sum of weights).

It is then determined (in block 1316) whether all the z-planes of the 3D volume have been considered by this thread. If not, then the z-coordinate is incremented (block 1318), and the process repeats for the next voxel in the z direction. In other words, the thread starts to iterate through equivalent voxels (i.e. ones with the same x,y coordinate) along the z direction of the volume, determining the truncated signed distance function values and averaging them with previous values.

This is repeated until the thread has iterated through all the z-planes. This is performed by each thread, each of which is allocated to a different x,y coordinate on the z-plane. This sequence of one plane of the volume at a time has good memory access efficiency characteristics, for the memory layout in FIG. 5, since one z-plane corresponds to a small contiguous region of the linear pitched array. Hence, once this is completed by all threads the whole 3D volume has been analyzed, and a truncated signed distance function calculated for each voxel relative to the depth image 414. The process then waits for the next depth image frame from the depth camera to be received, and starts again, adding more values to the 3D volume where possible.

The result of this process is a 3D volume that comprises voxels having an averaged value between −1 and +1 (although note that this average value may be represented by multiple values such as the "weighted sum" and "sum of weights" values above). An averaged value of zero indicates that a surface in the environment is present at that location. Because multiple frames of depth images are added to the volume over time, the model stored in the volume is gradually built up in more and more detail. Repeated measurements of the same region of the environment add more detail and effectively increase the resolution of the information provided by the depth camera. Furthermore, noise is also effectively averaged out from the depth images, leaving a much smoother surface. This enables detail to be seen in the model that cannot be seen from an individual depth image.

The use of separate execution threads in this manner enables computationally efficient processing over the whole 3D volume. For example, GPU processors are arranged to efficiently execute parallel program threads, where each thread is performing the same operations. This enables the model generation process described above with reference to FIG. 13 to be performed in real-time, such that the model is constructed at the frame-rate of the depth camera.

Although the present examples are described and illustrated herein as being implemented in a gaming system, the system described is provided as an example and not a limitation. As those skilled in the art will appreciate, the present examples are suitable for application in a variety of different types of interactive computing systems, including augmented reality systems and robotics systems, telepresence and simluations. Other examples include scanning a set for 3D TV or remote display of 3D presentations, generating content for virtual tourism, remote collaboration, scanning a scene for the emergency services and first responders.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An interactive computing system comprising:
    an input for receiving a first series of depth images from a mobile depth camera when in motion and a second series of depth images from the mobile depth camera when static;
    a real-time camera tracking engine for tracking a position of the mobile depth camera when in motion;
    a dense 3D environment modeling system arranged to generate a dense 3D model of the environment from any of the series of depth images and position data from the real-time camera tracking engine; and
    an integration engine arranged to integrate at least a part of the dense 3D model into an application and to provide user input to the application by tracking real-time movement in a part of the environment using the second series of depth images, the integration engine being further arranged to:
    analyze the dense 3D model to identify objects in the model;
    when an object is identified, input object type information into the application; and
    adjust operation of the application based on the input object type information,
    wherein:
        the object comprises an active object and the integration engine is further arranged to adjust an output of the active object;
        the object comprises a display and the integration engine is further arranged to automatically calibrate a position of an object relative to the display based on a detected relative position of the display and the mobile depth camera;
        the integration engine is further arranged to adjust the output of another detected object; or
        the object comprises another depth camera and the integration engine is further arranged to calibrate the system based on a relative position of each depth camera.

2. An interactive computing system according to claim 1, further comprising:
    an object recognition module arranged to analyze the dense 3D model of the environment and identify objects within the model.

3. An interactive computing system according to claim 2, wherein the integration engine is further arranged to adapt the application based on an object identified within the dense 3D model.

4. An interactive computing system according to claim 3, wherein adapting the application comprises automatically determining position calibration information for an object based on a detected relative location of a display and the mobile depth camera.

5. An interactive computing system according to claim 4, wherein the object comprises a pointing device or a user of the system.

6. An interactive computing system according to claim 1, further comprising the mobile depth camera.

7. An interactive computing system according to claim 6, further comprising a plurality of additional depth cameras.

8. An interactive computing system according to claim 3, wherein the identified object is a projector and the integration engine is arranged to use the 3D model to influence output of the projector.

9. An interactive computing system according to claim 1, wherein the system is a gaming system and the application is a game.

10. A method of operating an interactive computing system comprising:
    receiving a series of depth images from a mobile depth camera in motion around an environment;
    generating a dense 3D model of the environment from the series of depth images;
    integrating at least a part of the dense 3D model into an application, integrating at least the part of the dense 3D model into the application including:
    analyzing the dense 3D model to identify objects in the model;
    when an object is identified, inputting object type and object location information into the application; and
    adjusting operation of the application based on the input object type or location information;

receiving a second series of depth images from the mobile depth camera when not in motion; and tracking real-time movement in 3D in a region of the environment using the second series of depth images, and wherein:

the object comprises an active object and adjusting performance of the application includes adjusting an output of the active object;

the object comprises a display and adjusting performance of the application comprises automatically calibrating a position of an object relative to the display based on a detected relative position of the display and the mobile depth camera;

adjusting performance of the application comprises adjusting the output of another detected object; or the object comprises another depth camera and adjusting performance of the application comprises calibrating the system based on a relative position of each depth camera.

11. A method according to claim 10, further comprising: generating the dense 3D model using the second series of depth images.

12. A method according to claim 11, further comprising: updating the dense 3D model using the second series of depth images.

13. A method according to claim 10, wherein integrating at least the part of the dense 3D model into the application comprises:

analyzing the dense 3D model to automatically identify objects in the model; and adjusting operation of the application based on the input object type and location information.

14. A method according to claim 10, wherein the object comprises the active object and adjusting performance of the application comprises adjusting the output of the active object.

15. A method according to claim 10, wherein the object comprises the display and adjusting performance of the application comprises automatically calibrating the position of the object relative to the display based on the detected relative position of the display and the mobile depth camera.

16. A method according to claim 10, wherein adjusting performance of the application comprises adjusting the output of the another detected object.

17. A method according to claim 10, wherein the object comprises another depth camera and adjusting performance of the application comprises calibrating the system based on the relative position of each depth camera.

18. A method according to claim 10, further comprising: receiving a series of depth images from each of one or more additional depth cameras;

generating a dense 3D model of the environment from each series of depth images;

identifying common features in more than one dense 3D model; and computing relative locations of cameras based on the identified common features.

19. A method according to claim 10, wherein the interactive computing system is a gaming system and the application is a game.

20. A gaming system having a first and second phase of operation, the gaming system comprising:

an input for receiving a first series of depth images from a mobile depth camera in the first phase of operation and a second series of depth images from the mobile depth camera in the second phase of operation, wherein the mobile depth camera is in motion in the first phase of operation and is static in the second phase of operation;

a real-time camera tracking engine arranged to track a position of the mobile depth camera in the first phase of operation;

a dense 3D modeling system arranged to generate a 3D model of a room using at least the first series of depth images and the position of the mobile depth camera when each depth image was captured; and a gaming engine arranged to integrate at least a part of the dense 3D model into a game and to track real-time movement in a part of the room using the second series of depth images as a user input to the game, the gaming engine being further arranged to:

analyze the dense 3D model to identify objects in the model;

when an object is identified, input object type information into the game; and adjust operation of the game based on the input object type, and wherein:

the object comprises an active object and the gaming engine is further arranged to adjust an output of the active object;

the object comprises a display and the integration engine is further arranged to automatically calibrate a position of an object relative to the display based on a detected relative position of the display and the mobile depth camera;

the integration engine is further arranged to adjust the output of another detected object; or the object comprises another depth camera and the integration engine is further arranged to calibrate the system based on a relative position of each depth camera.

* * * * *